United States Patent
Wagman et al.

(10) Patent No.: US 10,153,577 B2
(45) Date of Patent: Dec. 11, 2018

(54) LOW-PROFILE POWER AND DATA CONTACTS

(71) Applicant: Apple Inc., Cupertino, CA (US)

(72) Inventors: Daniel C. Wagman, Scotts Valley, CA (US); Oliver C. Ross, San Francisco, CA (US); Eric S. Jol, San Jose, CA (US); Hani Esmaeili, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/948,050

(22) Filed: Apr. 9, 2018

(65) Prior Publication Data

US 2018/0226739 A1    Aug. 9, 2018

Related U.S. Application Data

(63) Continuation of application No. 15/138,216, filed on Apr. 26, 2016, now Pat. No. 9,948,018.

(60) Provisional application No. 62/254,033, filed on Nov. 11, 2015, provisional application No. 62/215,714, filed on Sep. 8, 2015.

(51) Int. Cl.
| | |
|---|---|
| *H01R 13/40* | (2006.01) |
| *H01R 12/77* | (2011.01) |
| *H01R 13/22* | (2006.01) |
| *G06F 1/16* | (2006.01) |
| *H01R 13/52* | (2006.01) |

(52) U.S. Cl.
CPC ........... *H01R 13/40* (2013.01); *G06F 1/1656* (2013.01); *H01R 12/77* (2013.01); *H01R 13/22* (2013.01); *H01R 13/521* (2013.01)

(58) Field of Classification Search
CPC ........ H01R 13/40; H01R 12/77; H01R 13/22; H01R 13/521; G06F 1/1656
USPC ................... 439/76.1, 67; 200/302.2, 302.1
See application file for complete search history.

(56) References Cited

U.S. PATENT DOCUMENTS

| | | |
|---|---|---|
| 5,213,314 A | 5/1993 | Kano et al. |
| 5,295,844 A | 3/1994 | Koshikawa et al. |
| 5,876,243 A | 3/1999 | Sangawa |
| 5,980,335 A | 11/1999 | Barbieri et al. |
| 6,780,019 B1 | 8/2004 | Ghosh et al. |
| 6,976,799 B2 | 12/2005 | Kim et al. |
| 7,306,494 B2 | 12/2007 | Soh et al. |
| 7,355,137 B2 | 4/2008 | Kawasaki |
| 7,661,968 B1 | 2/2010 | Duan et al. |
| 8,138,717 B2 | 3/2012 | Chatterjee et al. |

(Continued)

FOREIGN PATENT DOCUMENTS

| | | |
|---|---|---|
| AU | 2011100424 | 6/2011 |
| CN | 103718384 | 4/2014 |

(Continued)

OTHER PUBLICATIONS

Ex parte Quayle Action mailed Jun. 27, 2017 in U.S. Appl. No. 15/256,470, 8 pages.

(Continued)

*Primary Examiner* — Edwin A. Leon
(74) *Attorney, Agent, or Firm* — Kilpatrick Townsend & Stockton, LLP

(57) ABSTRACT

Contact structures that are readily manufactured, where contacts in the contact structures consume a minimal amount of surface area, depth, and volume in an electronic device.

20 Claims, 42 Drawing Sheets

(56) References Cited

U.S. PATENT DOCUMENTS

| | | |
|---|---|---|
| 8,263,886 B2 | 9/2012 | Lin |
| 8,344,836 B2 | 1/2013 | Lauder |
| 8,427,825 B2 | 4/2013 | Szczypinski |
| 8,498,100 B1 | 7/2013 | Whitt, III |
| 8,570,725 B2 | 10/2013 | Whitt, III |
| 8,699,215 B2 | 4/2014 | Whitt, III |
| 8,724,302 B2 | 5/2014 | Whitt, III |
| 8,780,540 B2 | 7/2014 | Whitt, III |
| 8,780,541 B2 | 7/2014 | Whitt, III |
| 8,830,668 B2 | 9/2014 | Whitt, III |
| 8,873,227 B2 | 10/2014 | Whitt, III |
| 8,878,637 B2 | 11/2014 | Sartee |
| 8,903,517 B2 | 12/2014 | Perek |
| 8,947,864 B2 | 2/2015 | Whitt, III |
| 8,953,310 B2 | 2/2015 | Smith |
| 8,975,991 B2 | 3/2015 | Lauder |
| 8,988,876 B2 | 3/2015 | Corbin |
| 9,000,871 B2 | 4/2015 | Cencioni |
| 9,036,340 B1 | 5/2015 | Colby |
| 9,075,566 B2 | 7/2015 | Whitt, III |
| 9,149,100 B2 | 10/2015 | Marshall |
| 9,158,384 B2 | 10/2015 | Whitt, III |
| 9,176,900 B2 | 11/2015 | Whitt, III |
| 9,176,901 B2 | 11/2015 | Whitt, III |
| 9,331,415 B2 | 5/2016 | Tagawa |
| 9,335,793 B2 | 5/2016 | Rothkopf |
| 9,455,759 B2 | 9/2016 | Jen |
| 9,485,338 B2 | 11/2016 | Balaji |
| 9,899,757 B2 * | 2/2018 | Do ............... H01R 13/42 |
| 2004/0209489 A1 | 10/2004 | Clapper |
| 2005/0026499 A1 | 2/2005 | Choi et al. |
| 2009/0247004 A1 | 10/2009 | Lou et al. |
| 2009/0257207 A1 | 10/2009 | Wang |
| 2010/0226509 A1 | 9/2010 | Filson et al. |
| 2010/0328230 A1 | 12/2010 | Faubert |
| 2011/0051360 A1 | 3/2011 | Dabov |
| 2011/0130048 A1 * | 6/2011 | Haunberger ........... H01R 24/40 439/660 |
| 2012/0194448 A1 | 8/2012 | Rothkopf |
| 2013/0035006 A1 | 2/2013 | Park et al. |
| 2013/0162554 A1 | 6/2013 | Lauder |
| 2013/0183861 A1 | 7/2013 | Chang et al. |
| 2013/0322000 A1 | 12/2013 | Whit et al. |
| 2014/0106594 A1 | 4/2014 | Skvoretz |
| 2014/0204514 A1 | 7/2014 | Whitt, III |
| 2014/0273546 A1 | 9/2014 | Harmon |
| 2014/0285957 A1 | 9/2014 | Rohrbach et al. |
| 2014/0377992 A1 | 12/2014 | Chang et al. |
| 2015/0093922 A1 | 4/2015 | Bosscher et al. |
| 2015/0127376 A1 | 5/2015 | Ortenzi et al. |
| 2015/0194764 A1 | 7/2015 | Magana |
| 2015/0241931 A1 | 8/2015 | Carnevali et al. |
| 2017/0068276 A1 * | 3/2017 | Wagman ............... G06F 1/1643 |
| 2017/0068286 A1 | 3/2017 | Esmaeili et al. |
| 2017/0069993 A1 | 3/2017 | Wagman et al. |
| 2017/0069994 A1 | 3/2017 | Wagman et al. |

FOREIGN PATENT DOCUMENTS

| | | |
|---|---|---|
| JP | S50-093595 | 8/1975 |
| JP | 53-96691 | 8/1978 |
| JP | H10-208809 | 8/1998 |
| JP | H11-045747 | 2/1999 |
| JP | 2001-291543 | 10/2001 |
| JP | 2001/313137 | 11/2001 |
| JP | 3090710 U | 10/2002 |
| JP | 2003-151256 | 5/2003 |
| JP | 2006/120498 | 5/2006 |
| JP | 2013-048018 | 3/2013 |
| JP | 2013182839 | 9/2013 |
| KR | 20130089479 A | 8/2013 |
| TW | 498709 | 8/2002 |

OTHER PUBLICATIONS

European Search Report dated Feb. 3, 2017 in European Patent Application No. 16186532.4, 9 pages.

Examination Report No. 1 dated Apr. 28, 2017 in Australian Patent Application No. 2016222505, 3 pages.

Evaluation Report for Utility Model Patent dated May 26, 2017 in Chinese Patent No. ZL2016210417275, 19 pages.

First Action Interview Pilot Program Pre-Interview Communication dated Aug. 31, 2017 in U.S. Appl. No. 15/476,829, 4 pages.

Office Action (English Translation) dated Sep. 29, 2017 in Japanese Patent Application No. 2016-169764, 6 pages.

Office Action (English Translation) dated May 7, 2018 in Japanese Patent Application No. 2016-169764, 10 pages.

Office Action (English Translation) dated Jun. 5, 2018 in Chinese Patent Application No. 201610807734.X, 15 pages.

* cited by examiner

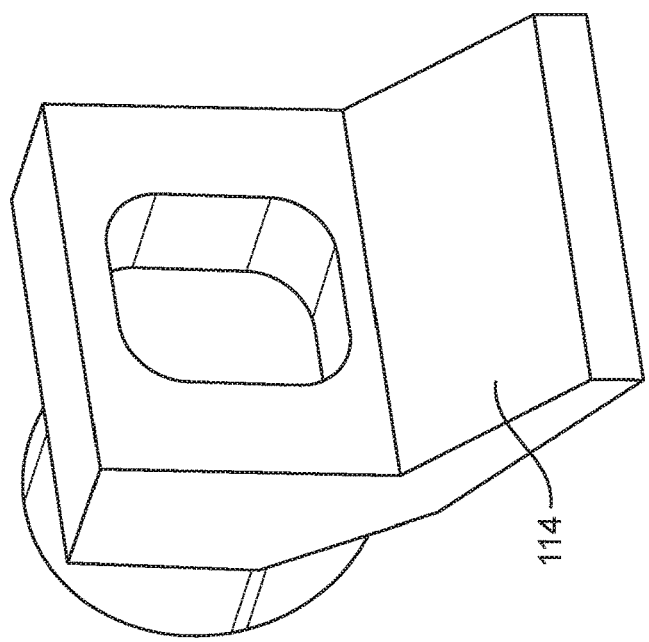
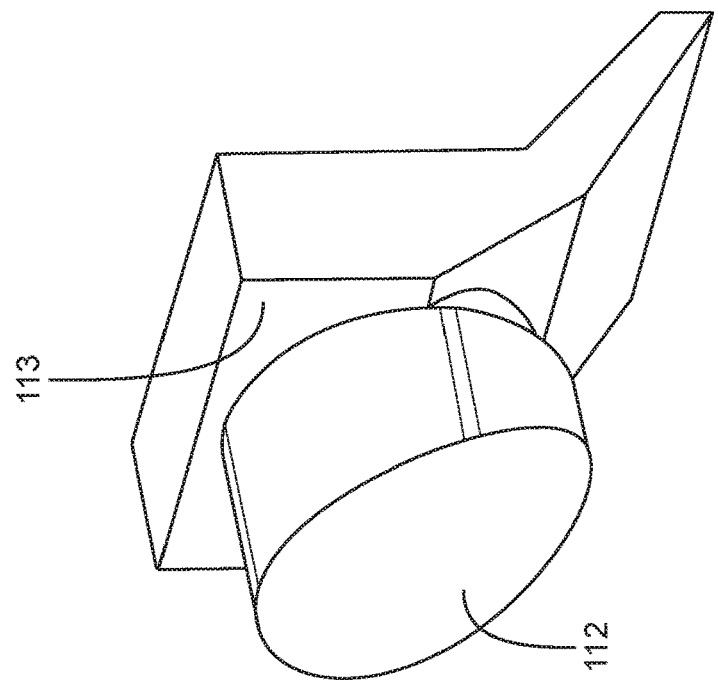
Figure 4

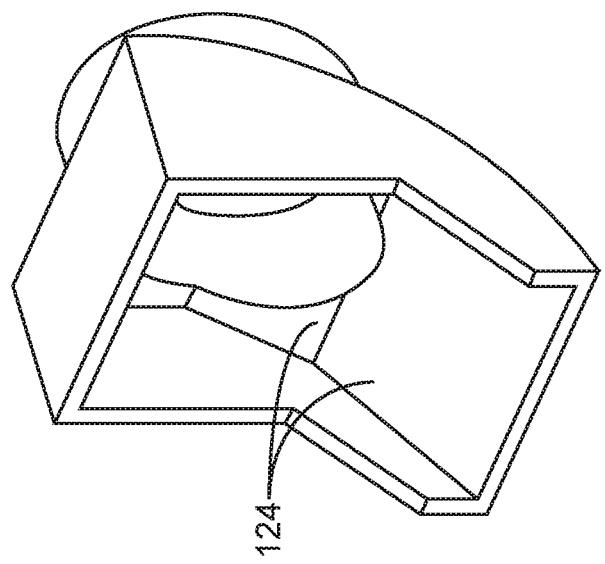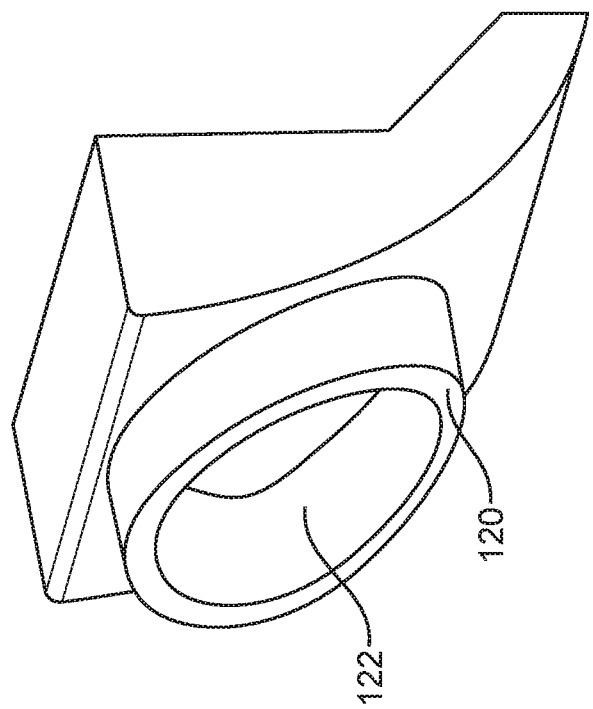
Figure 5

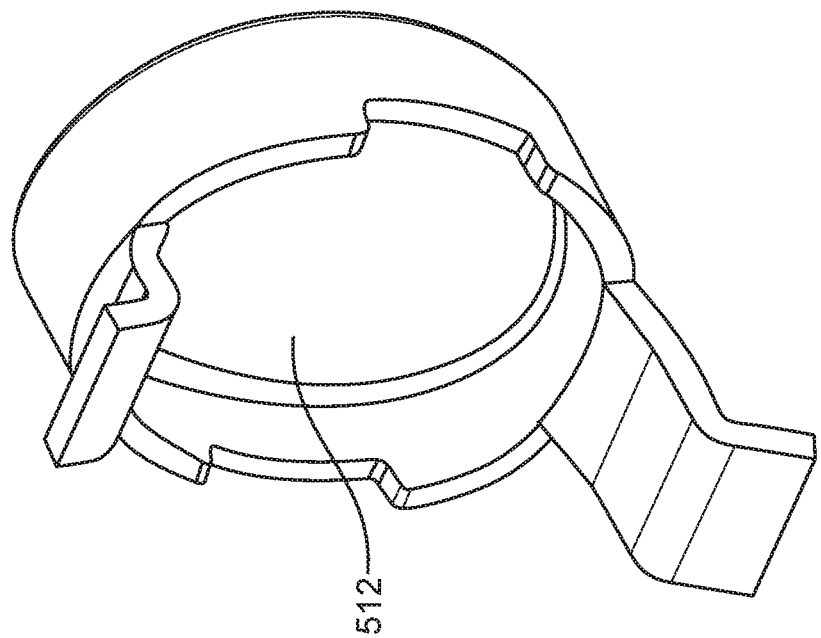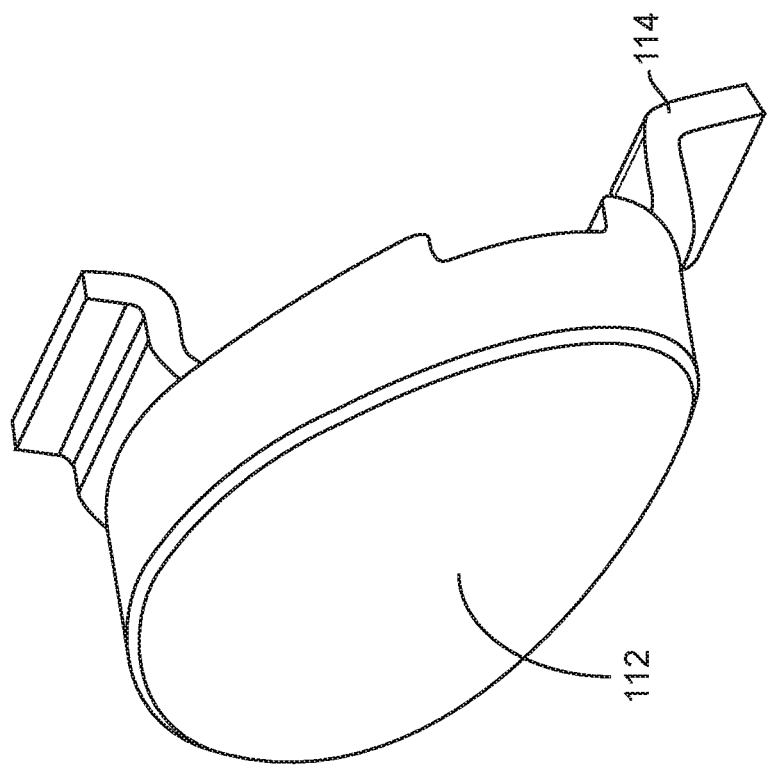
Figure 10

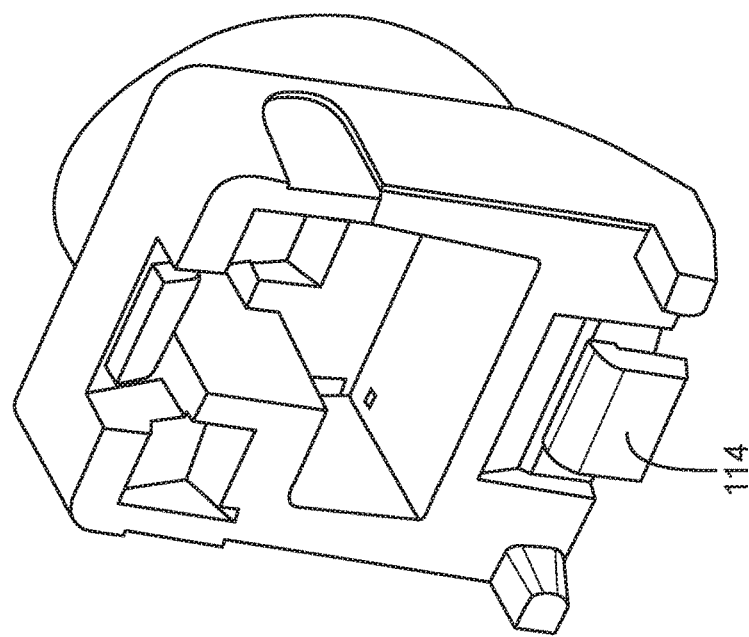
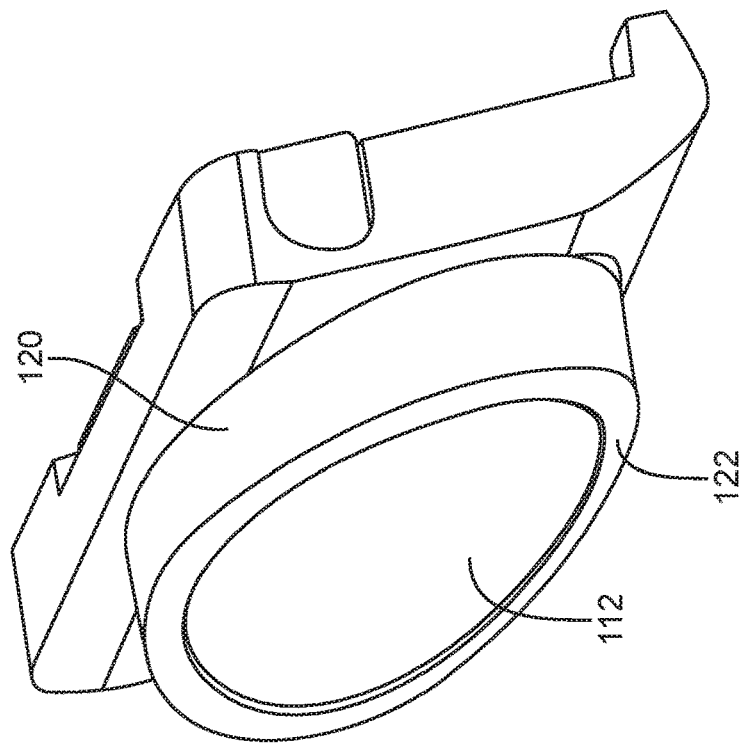
Figure 11

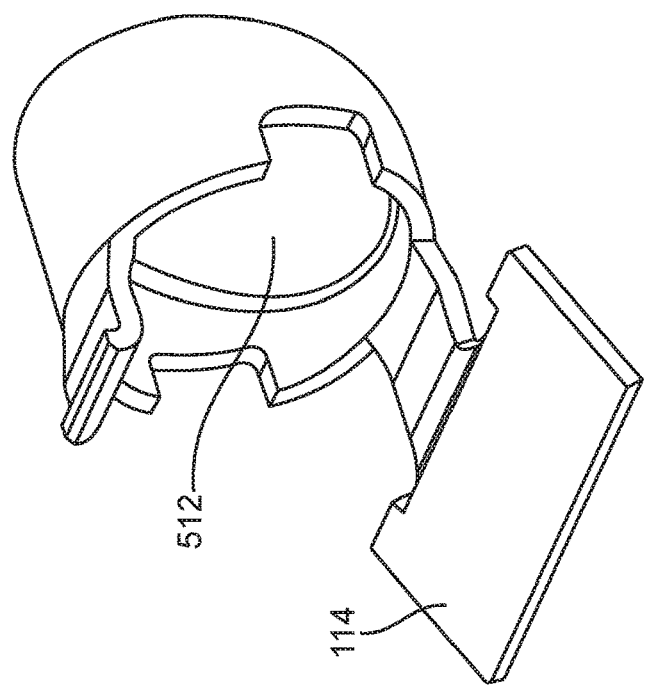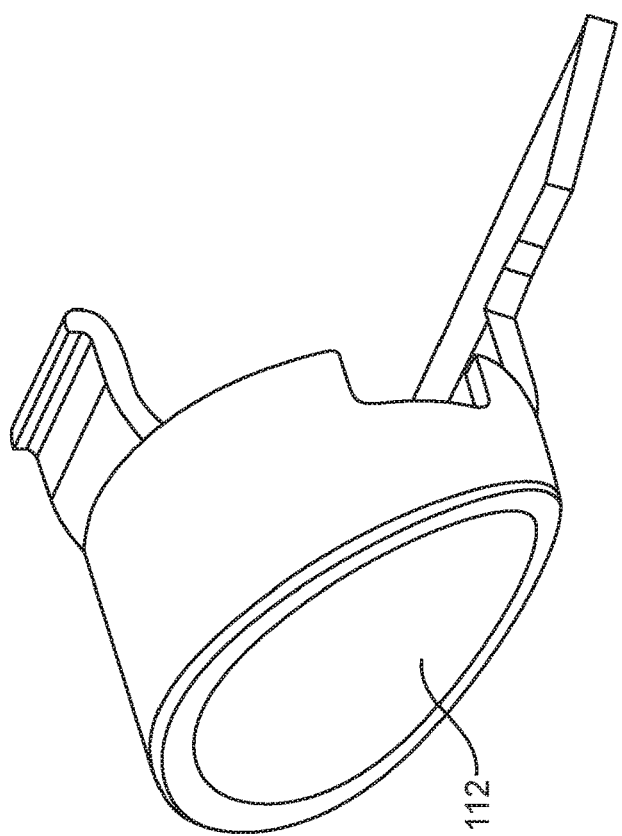
Figure 14

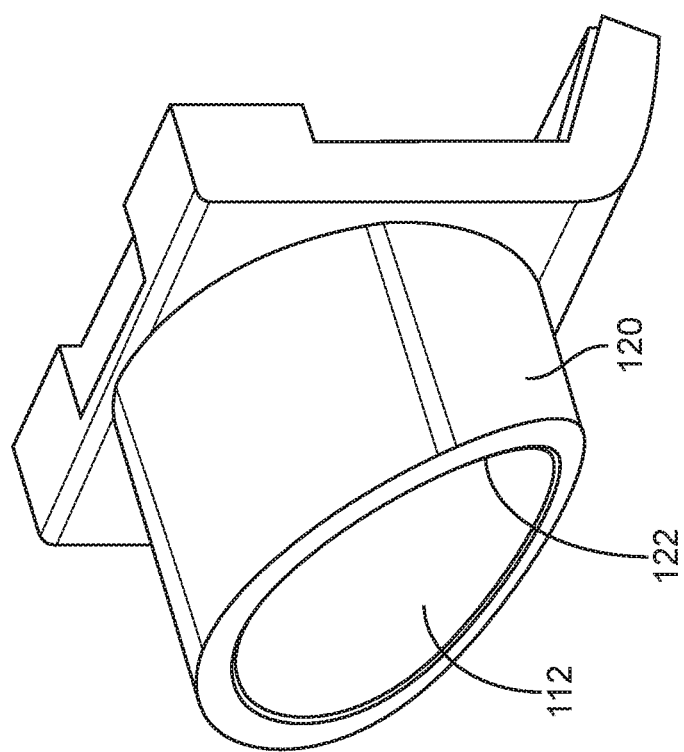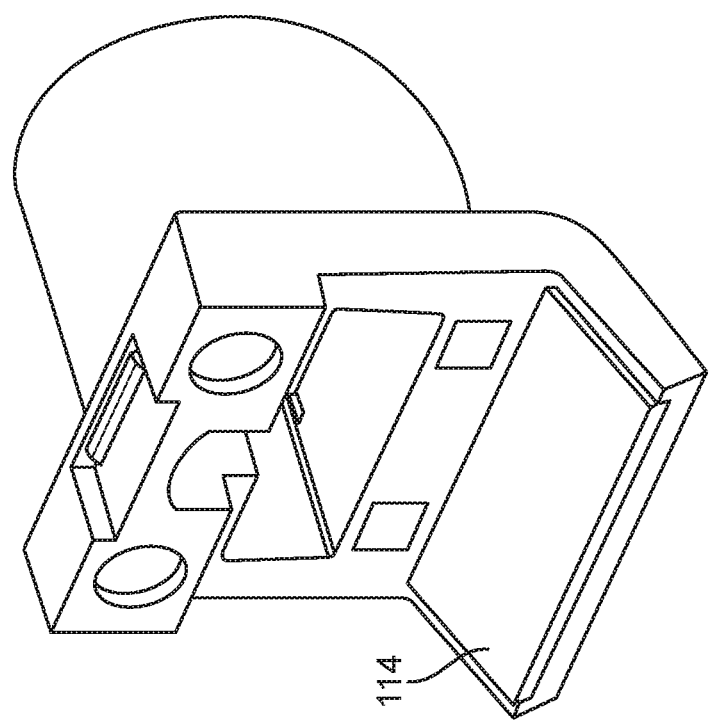
Figure 15

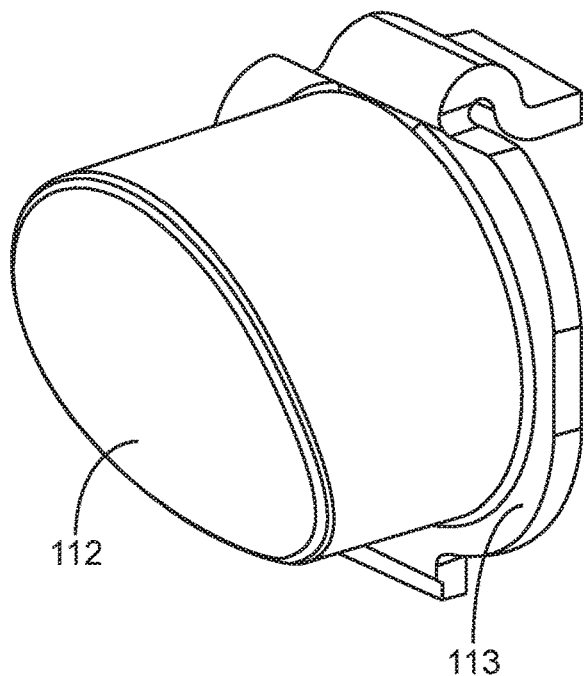
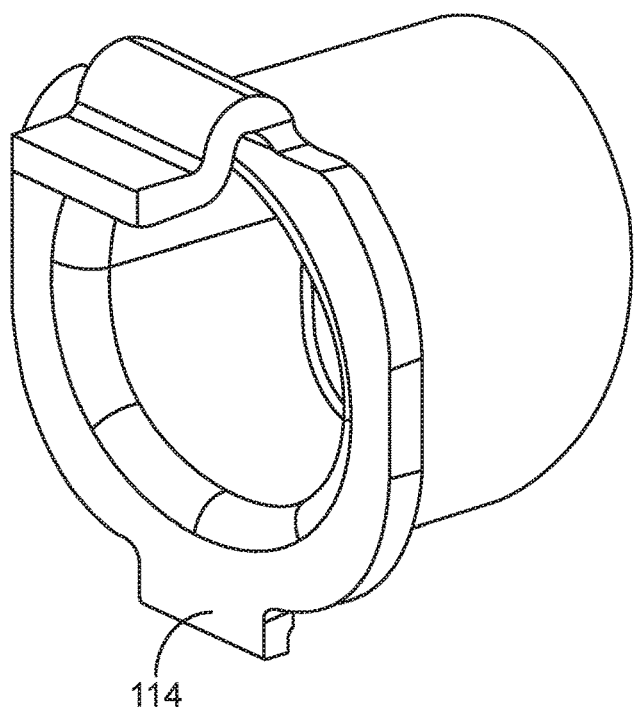
Figure 17

LOW-PROFILE POWER AND DATA CONTACTS

CROSS-REFERENCES TO RELATED APPLICATIONS

This application is a continuation of U.S. patent application Ser. No. 15/138,216, filed Apr. 26, 2016, which is a nonprovisional of U.S. provisional patent application No. 62/215,714, filed Sep. 8, 2015, and 62/254,033, filed Nov. 11, 2015, which are incorporated by reference.

BACKGROUND

The number of types of electronic devices that are commercially available has increased tremendously the past few years and the rate of introduction of new devices shows no signs of abating. Devices, such as tablet, laptop, netbook, desktop, and all-in-one computers, cell, smart, and media phones, storage devices, portable media players, navigation systems, monitors, and others, have become ubiquitous.

Power and data may be provided from one device to another over cables that may include one or more wire conductors, fiber optic cables, or other conductor. Connector inserts may be located at each end of these cables and may be inserted into connector receptacles in the communicating or power transferring devices. In other systems, contacts on the devices may come into direct contact with each other without the need for intervening cables.

In systems where contacts on two electronic devices come into contact with each other, the contacts may be located in a contact structure at a surface of an electronic device. It may be desirable that these contacts be substantially resistant to corrosion, otherwise such corrosion would be readily apparent to a user due to their surface location. Also, these contacts may often have a substantial depth and consume a relatively large volume of space in the electronic device. The loss of this space may mean that the electronic device is either larger, includes a reduced set of functionality, or both.

These electronic devices may be manufactured in large numbers. A corresponding number of contact structures may be manufactured for use in these devices. Any simplification in the manufacturing process of these contact structures may yield tremendous savings in the manufacturing of these electronic devices.

Thus, what is needed are contact structures that are readily manufactured, where contacts in the contact structures are resistant to corrosion and consume a minimal amount of surface area, depth, and volume in an electronic device.

SUMMARY

Accordingly, embodiments of the present invention may provide contact structures that are readily manufactured, where contacts in the contact structures are resistant to corrosion and consume a minimal amount of surface area, depth, and volume in an electronic device.

An illustrative embodiment of the present invention may provide a contact structure for an electronic device. The contact structure may include one, two, three, four, or more than four contacts. These contacts may be formed by machining, etching, printing, casting, forging, by using a deep drawn or other process. Each contact may be located in an opening in a device enclosure where a plastic insulator is placed between the contact and the device enclosure. The contacts and plastic insulators may be substantially flush with, or recessed a limited amount relative to, a surface of the device enclosure around the contacts. This surface may be curved or flat, or have other contours. Other contacts, such as fiber-optic contacts, may be included.

During assembly, a flexible circuit board may be attached to rear portions of each contact. These rear portions may be horizontal, vertical, or angled. Traces in the flexible circuit board may be soldered, spot, laser, or resistance welded, or otherwise electrically and mechanically attached to portions of each contact. Electrostatic discharge (ESD) diodes may be electrically connected between one or more traces of the flexible circuit board and the device enclosure for ESD protection. The contacts may be fit into plastic insulators and glued or otherwise fixed in place. The plastic insulators may be glued or otherwise fixed in place to an inside surface of the device enclosure such that the contacts are exposed at an outside surface of the device enclosure. A bracket or other attachment mechanism may be attached to backs of the contacts and an inside surface of the device enclosure and glued or otherwise fixed in place.

Another illustrative embodiment of the present invention may provide another contact structure for an electronic device. In this embodiment of the present invention, a number of contacts held in place by a carrier may be stamped. The contacts may be stamped to have contacting portions and a rear angled portion. After stamping, the contacts may be blasted and plated. The carrier may be split up and strips of the carrier may be placed on a dummy carrier such that the contacts may be placed in groups. A plastic insulator may be formed around each group of contacts or a plastic insulator may be glued to each group of contacts. The dummy carrier may be removed and a flexible circuit board may then be soldered to rear angled portions of contacts. The contacts may then be aligned with openings a device enclosure and the plastic insulator may be glued in place. A bracket may be placed behind the contacts and glued or otherwise fixed to an inside surface of device enclosure to further secure the contacts in place.

Another illustrative embodiment of the present invention may provide another contact structure for an electronic device. In this embodiment of the present invention, a contact may be in an opening in a device enclosure. A plastic insulator may be between the contact and the device enclosure. A silicone gasket or other seal may be between the plastic insulator and an inside surface of the device enclosure to provide protection against the ingress of liquids, moisture, and debris. An optional shim may be used to align a surface of the contact with a surface of the device housing the contact structure. The shim may be selected from a set of shims having different sizes in order to properly align the surfaces. The contact may include a contacting portion soldered or otherwise attached to a trace of a flexible circuit board. A heat-activated film or adhesive may be used to fix the flexible circuit board to the plastic insulator. A rear bracket or cowling may be used to secure the contact and plastic insulator in place in the device enclosure.

These contact structures may be formed in various ways. In one embodiment of the present invention, contacts at ends of a carrier may be coined, forged, or formed in other ways. A dummy carrier may be stamped and the carrier may be attached to the dummy carrier. The contacts may be polished, blasted, and plated. The contacts may then be overmolded and the carrier and the dummy carrier may be detached.

In another embodiment of the present invention, contacts may be stamped, turned, forged or machined. A carrier may then be formed, for example by stamping. The contacts may be placed on the carrier. The contacts may then be polished, blasted, and plated. The contacts may then be over-molded and the carrier and the carrier may be detached.

Embodiments of the present invention may provide contacts that are resistant to corrosion. These contacts may include a top plate to match a color of a device enclosure around the contacts. This top plate may be 0.25 to 1.0 microns, 0.5 to 1.0 microns, 0.5 to 0.85 microns, 0.75 to 0.85 microns thick, or it may have another thickness. At an exposed surface of the contact, gold plating layer may be below the top plate. On other portions of the contact, the top plate may be omitted and the gold plating layer may be the first layer. This layer may be between 0.01 to 0.5 microns or between 0.05 and 0.1 microns thick, or it may have another thickness. A copper layer in the range of 1.0, 2.0, 3.0 or 4.0 microns in thickness may be used. An optional palladium layer may be used above the copper layer. This layer may have a thickness between 0.15 and 2.0 microns, 1.0 and 1.5 microns, 1.0 and 2.0 microns, or it may have another thickness. An optional SnCu (tin copper) layer may be used between a gold layer and a copper layer in areas where contacts may be soldered to flexible circuit boards. This optional SnCu layer may be between 4, 5, and 6 microns in thickness, for example, between 4 and 6 or between 5 and 6 microns in thickness, though it may have other thicknesses consistent with embodiments of the present invention. Another embodiment of the present invention may include a base layer of copper in the range of 1.0, 2.0, 1.0-2.0, 2.0-3.0, 3.0 or 4.0 microns in thickness. A palladium layer may be used above the copper layer. This layer may have a thickness between 0.15 and 2.0 microns, 1.0 and 1.5 microns, 1.0 and 2.0 microns, or it may have another thickness. A gold flash may be placed on that layer. This may be followed by a top plating to match a color of a device enclosure around the contacts. This top plate may be 0.25 to 1.0 microns, 0.5 to 1.0 microns, 0.5 to 0.85 microns, 0.75 to 0.85 microns thick, or it may have another thickness. Other portions of the contacts may have the copper layer, a thinner Pd (palladium) layer in the range of one, two, or threes tenth of a micron may be used, followed by a gold flash.

Embodiments of the present invention may provide contact structures that may be located in various types of devices, such as portable computing devices, tablet computers, desktop computers, laptops, all-in-one computers, wearable computing devices, cell phones, smart phones, media phones, storage devices, keyboards, covers, cases, portable media players, navigation systems, monitors, power supplies, adapters, remote control devices, chargers, and other devices. These contact structures may provide pathways for signals and power compliant with various standards such as one of the Universal Serial Bus (USB) standards including USB Type-C, High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future. In one example, the contact structures may be used to convey a data signal, a power supply, and ground. In various embodiments of the present invention, the data signal may be unidirectional or bidirectional and the power supply may be unidirectional or bidirectional.

Various embodiments of the present invention may incorporate one or more of these and the other features described herein. A better understanding of the nature and advantages of the present invention may be gained by reference to the following detailed description and the accompanying drawings.

BRIEF DESCRIPTION OF THE DRAWINGS

FIG. 4 illustrates the contact of FIG. 3;

FIG. 5 illustrates a plastic insulator for the contact of FIG. 3;

FIG. 10 illustrates the contact of FIG. 9;

FIG. 11 illustrates a the contact of FIG. 10 in a plastic insulator according to an embodiment of the present invention;

FIG. 14 illustrates the contact of FIG. 13;

FIG. 15 illustrates a the contact of FIG. 14 in a plastic insulator according to an embodiment of the present invention;

FIG. 17 illustrates another contact according to an embodiment of the present invention;

DESCRIPTION OF EXEMPLARY EMBODIMENTS

Figure 1:
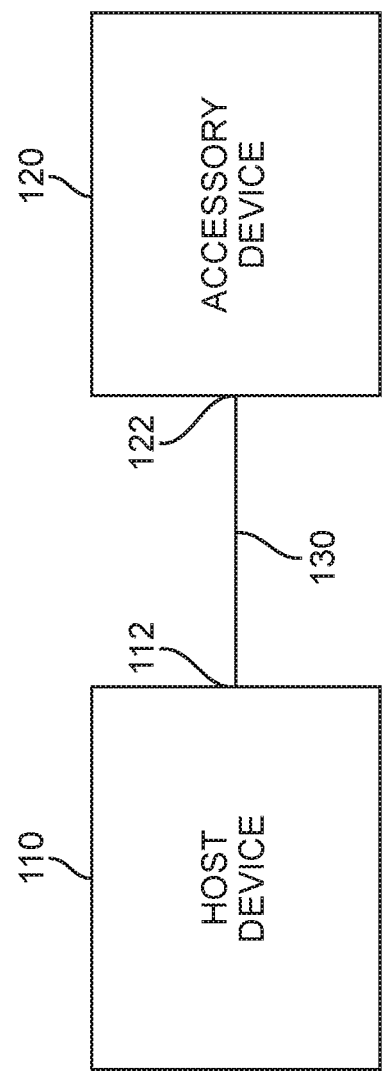
FIG. 1 illustrates an electronic system according to an embodiment of the present invention.

FIG. 1 illustrates an electronic system according to an embodiment of the present invention. This figure, as with the other included figures, is shown for illustrative purposes and does not limit either the possible embodiments of the present invention or the claims.

In this example, host device 110 may be connected to accessory device 120 in order to share data, power, or both. Specifically, contacts 112 on host device 110 may be electrically connected to contacts 122 on accessory device 120. Contacts 112 on host device 110 may be electrically connected to contacts 122 on accessory device 120 via cable 130. In other embodiments of the present invention, contacts 112 on host device 110 may be directly and electrically connected to contacts 122 on accessory device 120. In still other embodiments of the present invention, one or more optical contacts supporting one or more optical connections between host device 110 and accessory device 120 may be included.

To facilitate a direction connection between contacts 112 on host device 110 and contacts 122 on accessory device 120, contacts 112 may be part of a surface mount contact structure. Examples of surface mount contact structures that may include contacts 112 are shown in the following figures.

Figure 2:
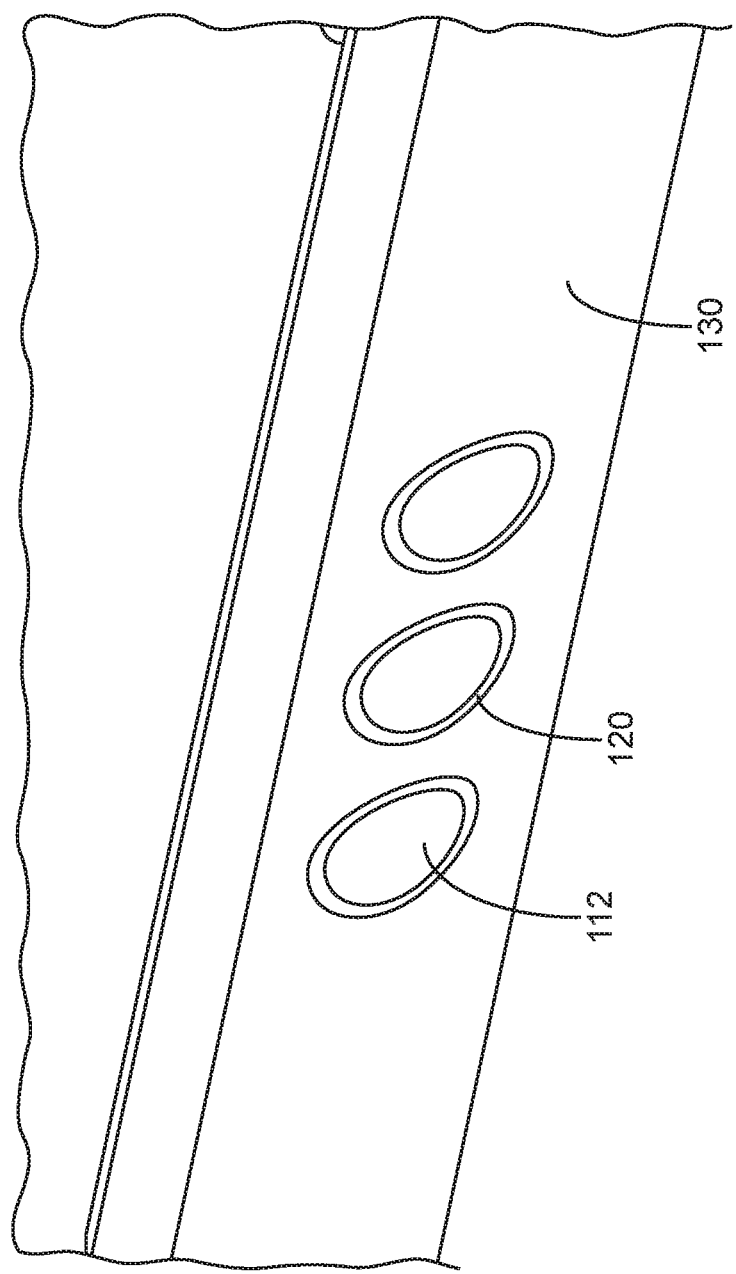
FIG. 2 illustrates a contact structure in a device enclosure according to an embodiment of the present invention.

FIG. 2 illustrates a contact structure in a device enclosure according to an embodiment of the present invention. In this example, contacts 112 may be located at a surface of device enclosure 130. An insulating ring formed by a plastic insulator 120 may surround an outside edge of contacts 112 and may be located between contacts 112 and device enclosure 130. Plastic insulator 120 may electrically isolate contacts 112 from device enclosure 130. In these and other embodiments the present invention, contacts 112 and the insulating ring formed by plastic insulator 120 may be substantially flush with, or recessed a limited amount relative to, a surrounding surface of device enclosure 130. These surfaces may be curved, they may be substantially flat, or they may have other contours.

Figure 3:
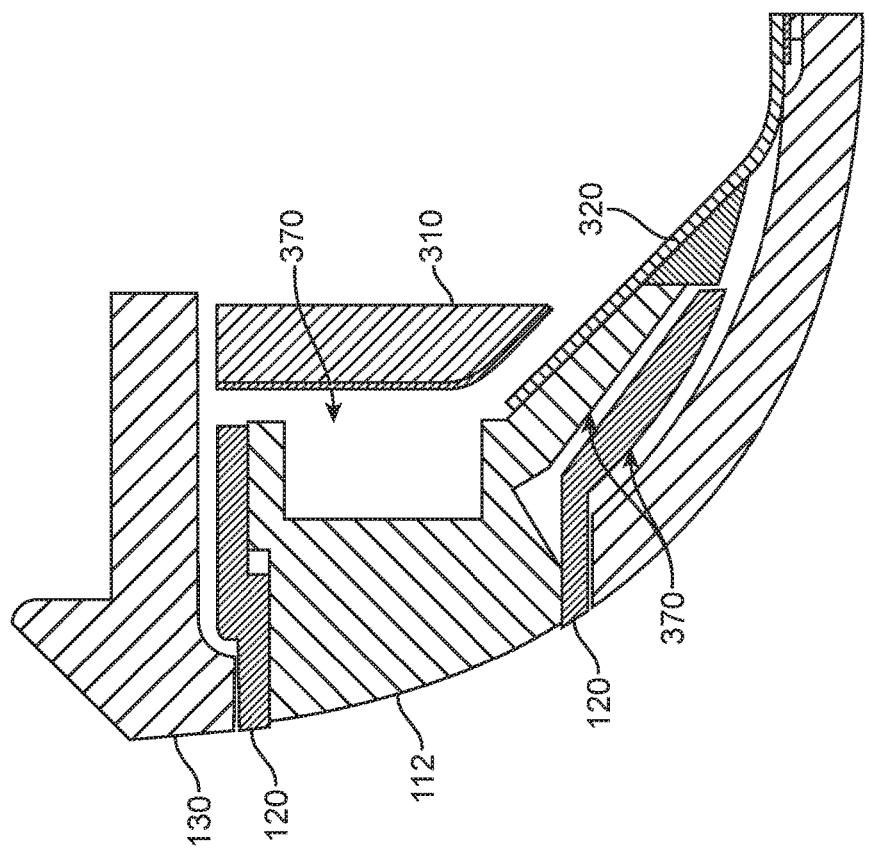
FIG. 3 illustrates a cutaway side view of a contact structure according to an embodiment of the present invention.

FIG. 3 illustrates a cutaway side view of a contact structure that may be used for the contact structure of FIG. 2. In this example, contact 112 may be located in an opening in device enclosure 130. A plastic insulator 120 may be located between contacts 112 and device enclosure 130. A flexible circuit board 320 may connect to contact 112. A bracket 310 may be used to secure contacts 112 in place in device enclosure 130. In various embodiments of the present invention, various adhesives may be used to secure these structures in place. Specifically, adhesive layers 370 may be used to secure contact 112 to plastic insulator 120. Adhesive layers 370 may also be used to secure plastic insulator 120 to device enclosure 130. Also, adhesive layers 370 may be used to secure bracket 310 in place in device enclosure 130.

FIG. 4 illustrates the contact of FIG. 4. This contact 112 may include a contacting portion emerging from a front face 113. Contacts 112 may further have a rear angle portion 114 that may connect to flexible circuit board 320.

Contact 112 may be formed by machining, forging, printing, etching, stamping, or in other ways. In other embodiment of the present invention, contacts 112 may be formed by a deep drawn process.

FIG. 5 illustrates a plastic insulator according to an embodiment of the present invention. In this example, plastic insulator 120 may have openings 122 for accepting contacts 112. Rear surfaces 124 may be covered with adhesives and contacts 112 may be joined to plastic insulators 120 at those locations.

Figure 6:
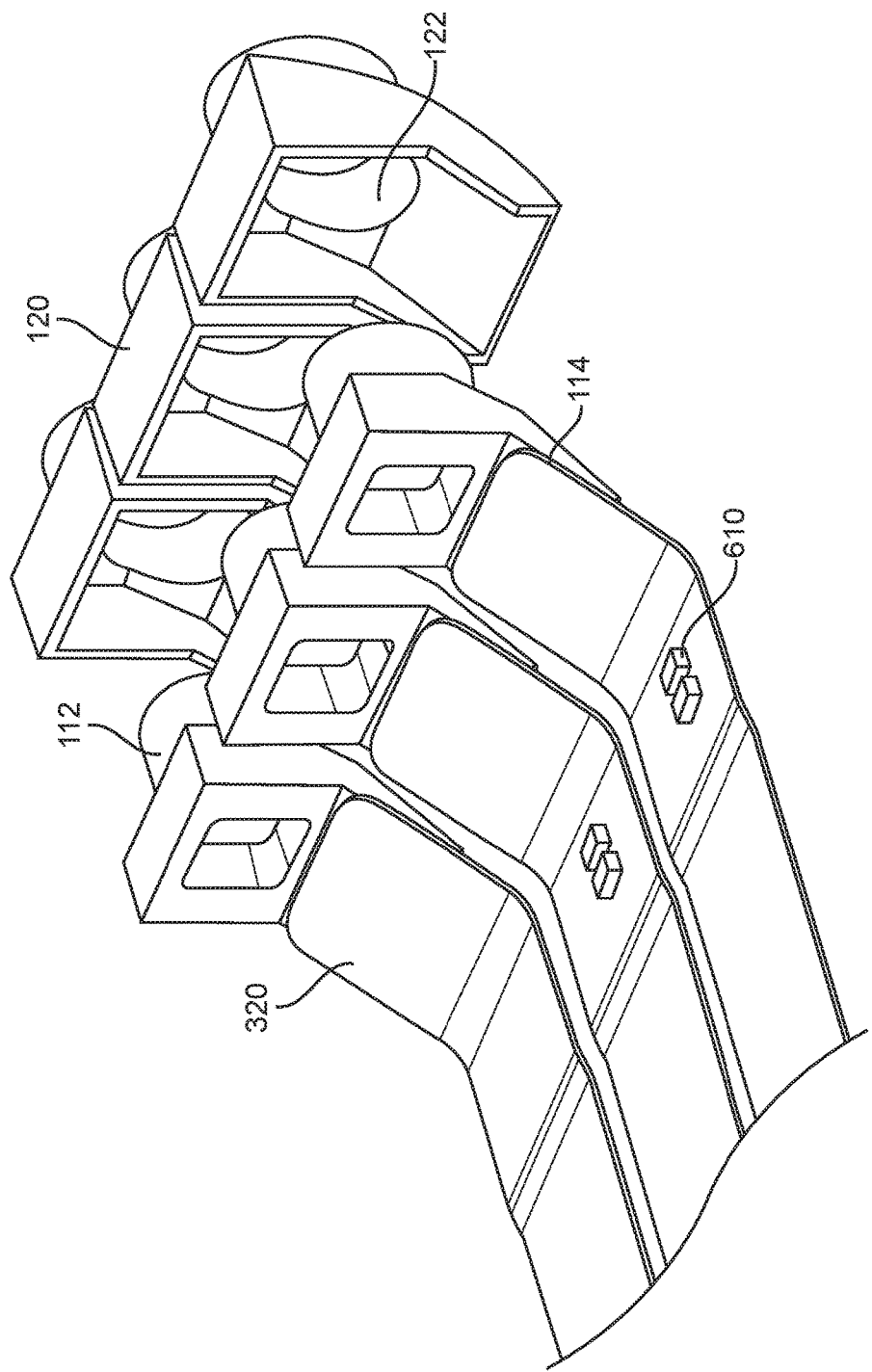
FIGS. 6-8 illustrate a method of assembling a contact structure in a device according to an embodiment of the present invention.
Figure 7:
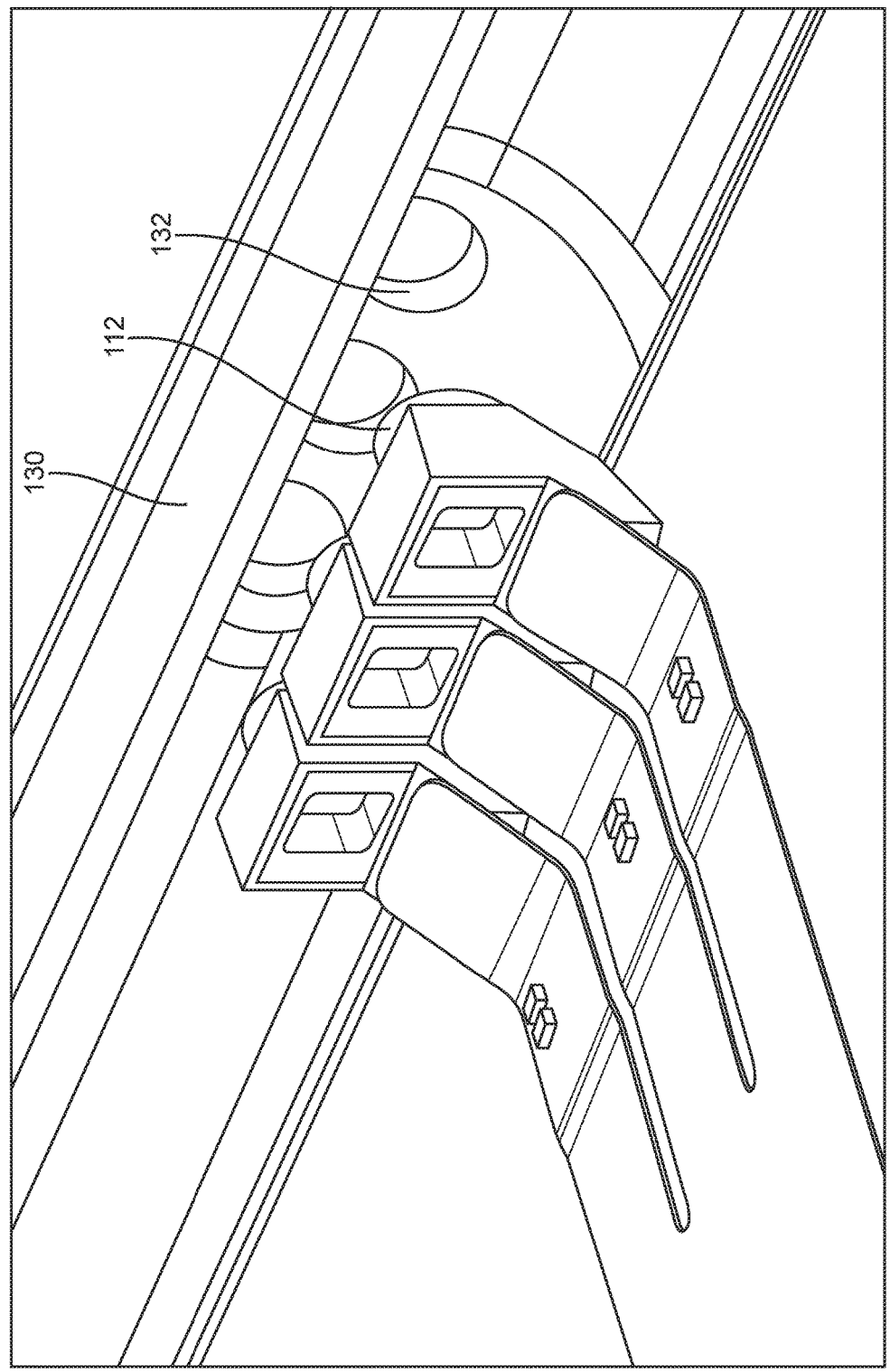
Figure 8:
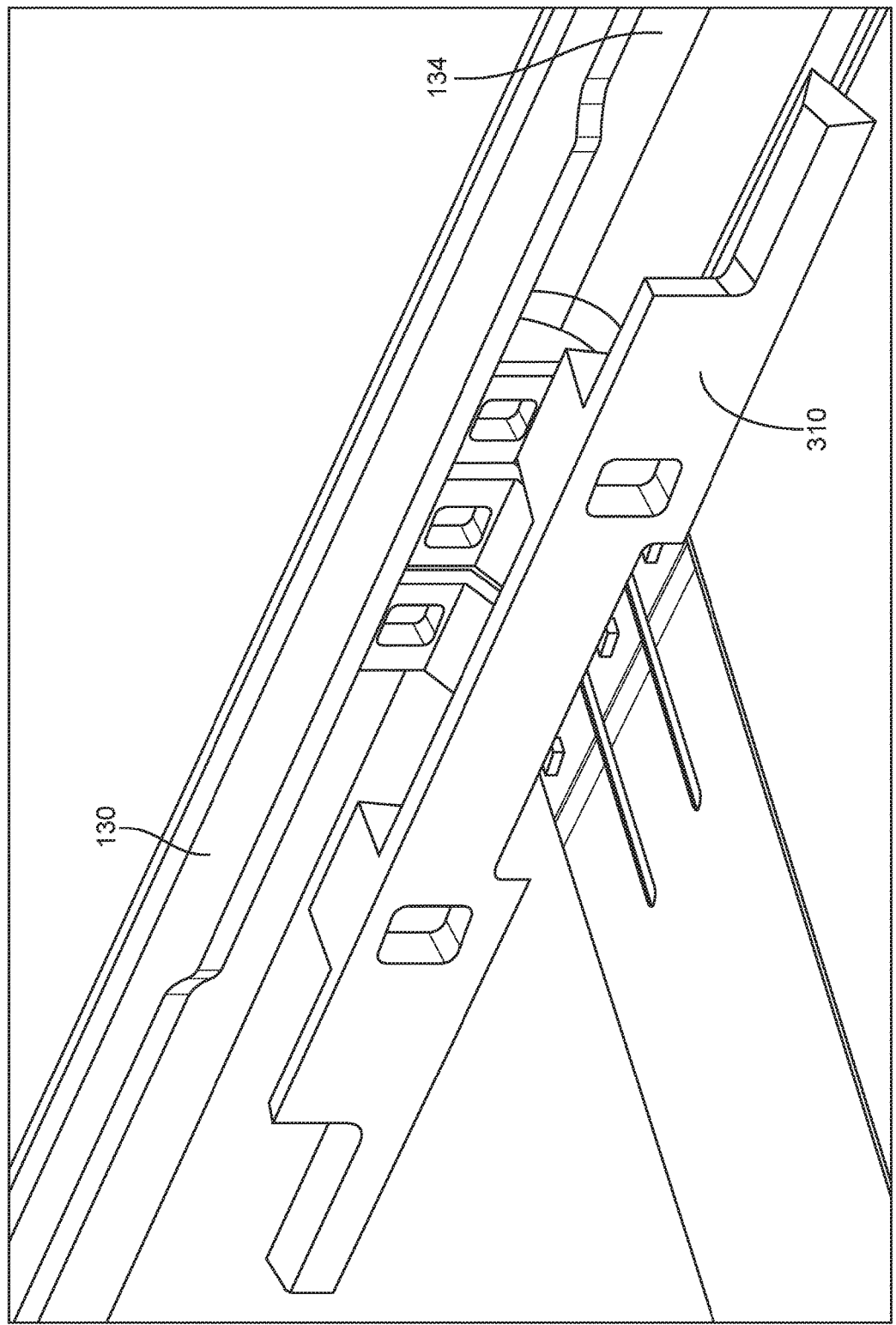

FIGS. 6-8 illustrate a method of assembling a contacts structure according to an embodiment of the present invention. In FIG. 6, a number of contacts 112 may be mated to a flexible circuit board 320 according to an embodiment of the present invention. Contacts on flexible circuit board 320 may be attached to rear portions 114 of contacts 112 by soldering, laser, spot, or resistance welding, or by other method. In this example, flexible circuit board 320 may have three portions, each connected to an angled portion 114 of a contact 112. Diodes 610 may be connected between flexible circuit board traces in flexible circuit board 320 and the device enclosure 130 (shown in FIG. 3) to provide ESD protection. In this example, flexible circuit board 320 may be split into three portions as shown to provide a greater flexibility in attaching flexible circuit board 320 to rear portions 114 of contacts 112. Contacts 112 may be aligned with openings 122 in plastic insulators 120.

In FIG. 7, barrels including contacts 112 in plastic insulators 120 (as shown in FIG. 6) may be aligned with openings 132 in device enclosure 130. Plastic insulators 120 may be glued in place. In FIG. 8, bracket 310 may be glued in place in notch 134 in device enclosure 130.

In various embodiments of the present invention, different portions of these contact structures and other contact structures may be formed of various materials. For example, bracket 310 and plastic insulators 120 may be formed of the same or different materials, such as plastic, LPS, or other non-conductive or conductive material. Contacts 112 may be formed of noncorrosive materials, such as gold, gold plated copper, gold plated nickel, gold-nickel alloy, and other materials.

In various embodiments of the present invention, different portions of these contact structures and other contact structures may be formed in various ways. For example, bracket 310 and plastic insulators 120 may be formed using injection or other molding, printing, or other technique. Contacts 112 may be machined, stamped, coined, forged, printed, or formed in different ways, such as by using a deep drawn process. Plastic insulator 120 may be formed around contacts 112 using injection molding.

Figure 9:
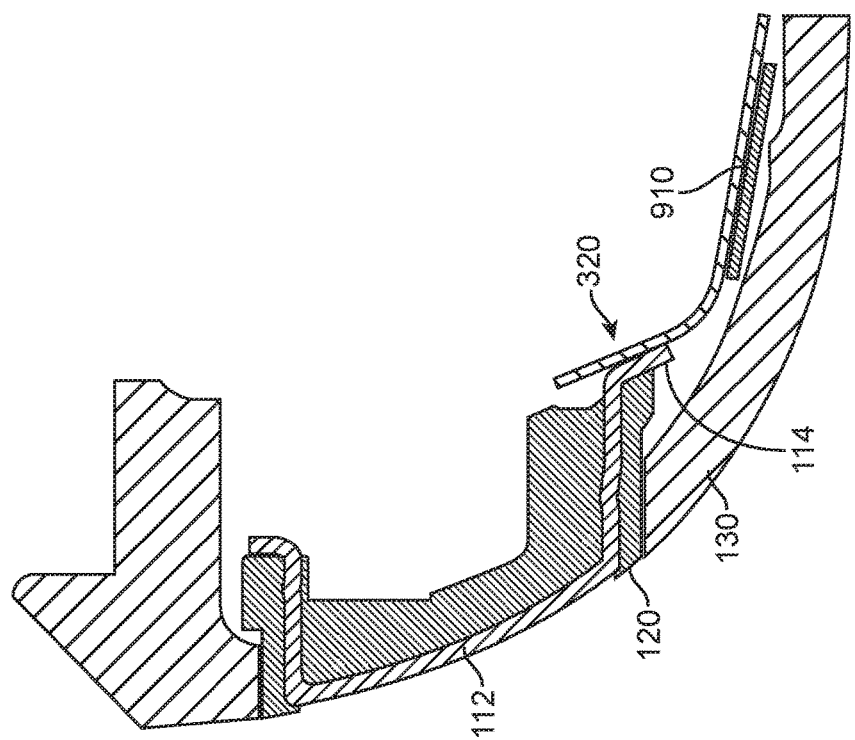
FIG. 9 illustrates a cutaway side view of another contact structure according to an embodiment of the present invention.

FIG. 9 illustrates a cutaway side view of another contact structure that may be used for the contact structure of FIG. 2. In this example, contact 112 may be located in an opening in device enclosure 130. A plastic insulator 120 may be located between contact 112 and device enclosure 130. A flexible circuit board 320 may connect to contact 112 at rear portion 114. An optional bracket (not shown) may be used to secure contacts 112 in place in device enclosure 130, though in other embodiments of the present invention, contacts 112 and insulators 120 may be glued or otherwise fixed in place. In various embodiments of the present invention, various adhesives may be used to secure these structures in place. Specifically, adhesive layers may be used to secure contact 112 to plastic insulator 120. Adhesive layers may also be used to secure plastic insulator 120 to device enclosure 130. Also, adhesive layers 370 may be used to secure an optional bracket in place in device enclosure 130. Support 910 may provide mechanical support for flexible circuit board 320. Support 910 may include ESD diodes (as shown below in FIG. 12.)

FIG. 10 illustrates the contact of FIG. 9. In this example, a force may be applied at surface 512 to form contacts 112 in a deep drawn process. As before, contact 112 may include a rear angle piece 114 that may be mated with a flexible circuit board. In other embodiment of the present invention, contact 112 may be formed by machining, forging, printing, etching, stamping, or in other ways.

FIG. 11 illustrates the contact of FIG. 10 in a plastic insulator according to an embodiment of the present invention. In this example, plastic insulator 120 may have openings 122 for accepting contacts 112. Rear contact portions 114 may extend from insulator 120.

Figure 12:
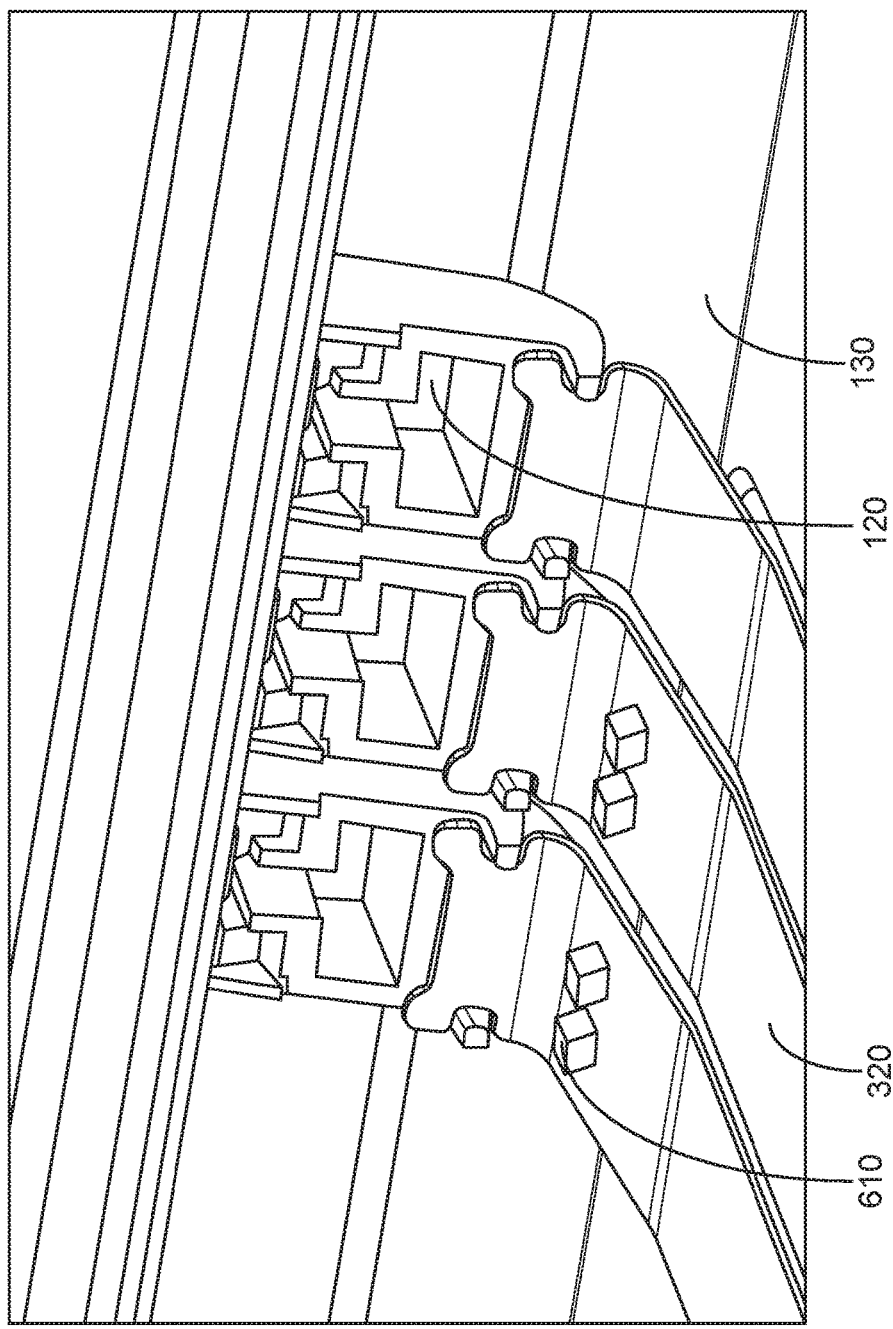
FIG. 12 illustrate an assembled contact structure in a device according to an embodiment of the present invention.

FIG. 12 illustrates an assembled contact structure according to an embodiment of the present invention. A number of contacts 112 (not shown) in insulators 120 may be mated to flexible circuit board 320 according to an embodiment of the present invention. Contacts on flexible circuit board 320 may be attached to rear portions 114 of contacts 112 (as shown in FIG. 9) by soldering, laser, spot, or resistance welding, or by other method. In this example, flexible circuit board 320 may have three portions, each connected to a rear portion 114 of a contact 112. Diodes 610 may be connected between flexible circuit board traces in flexible circuit board 320 and the device enclosure 130 to provide ESD protection. In this example, flexible circuit board 320 may be split into three portions as shown to provide a greater flexibility in attaching flexible circuit board 320 to rear portions 114 of contacts 112.

Figure 13:
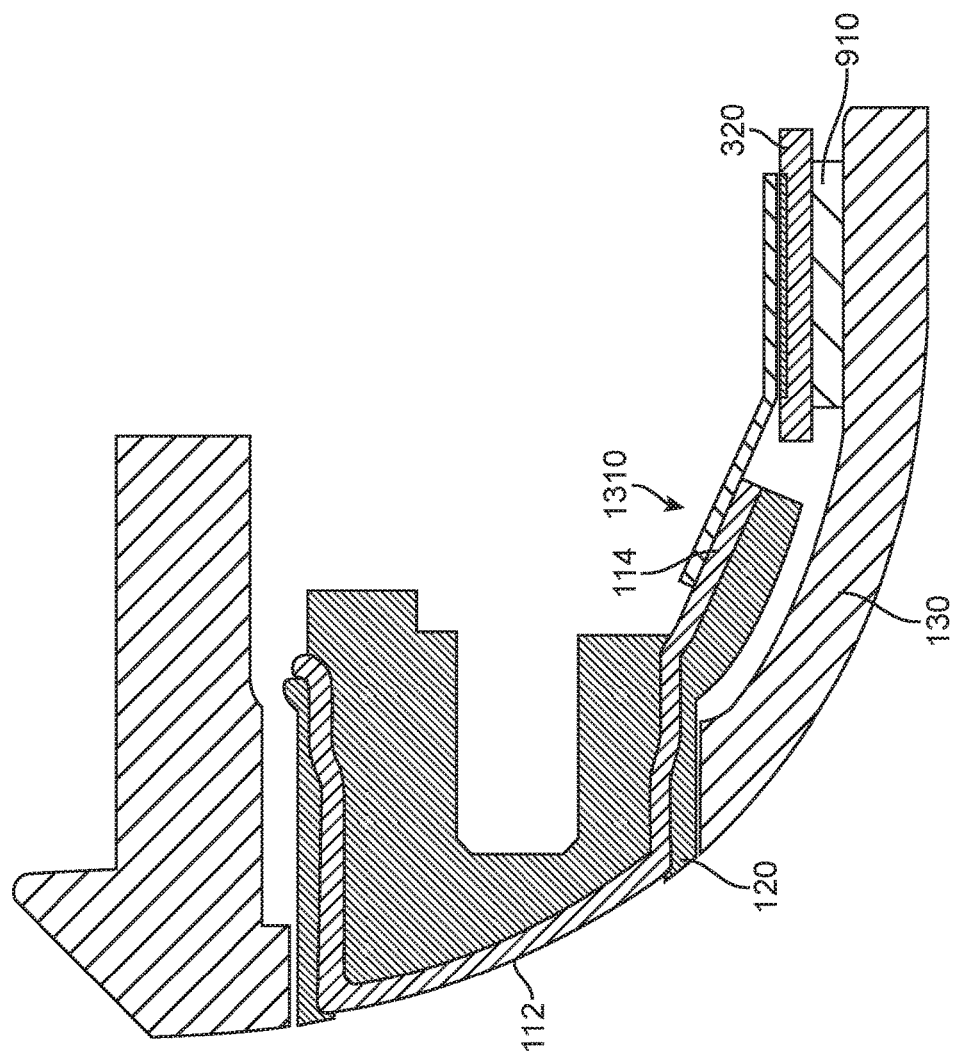
FIG. 13 illustrates a cutaway side view of another contact structure according to an embodiment of the present invention.

FIG. 13 illustrates a cutaway side view of another contact structure that may be used for the contact structure of FIG. 2. In this example, contact 112 may be located in an opening in device enclosure 130. A plastic insulator 120 may be located between contact 112 and device enclosure 130. A bridging piece 1310 may connect flexible circuit board 320 to contact 112 at rear portion 114. An optional bracket (not shown) may be used to secure contacts 112 in place in device enclosure 130, though in other embodiments of the present invention, contacts 112 and insulators 120 may be glued or otherwise fixed in place. In various embodiments of the present invention, various adhesives may be used to secure these structures in place. Specifically, adhesive layers may be used to secure contact 112 to plastic insulator 120. Adhesive layers may also be used to secure plastic insulator 120 to device enclosure 130. Also, adhesive layers 370 may be used to secure an optional bracket in place in device enclosure 130. Support 910 may provide mechanical support for flexible circuit board 320. Support 910 may include ESD diodes (as shown below in FIG. 16.)

FIG. 14 illustrates the contact of FIG. 13. In this example, a force may be applied at surface 512 to form contacts 112 in a deep drawn process. As before, contact 112 may include a rear angle piece 114 that may be mated with a flexible circuit board. In other embodiment of the present invention, contact 112 may be formed by machining, forging, printing, etching, stamping, or in other ways.

FIG. 15 illustrates the contact of FIG. 10 in a plastic insulator according to an embodiment of the present invention. In this example, plastic insulator 120 may have openings 122 for accepting contacts 112. Rear contact portions 114 may extend from insulator 120.

Figure 16:
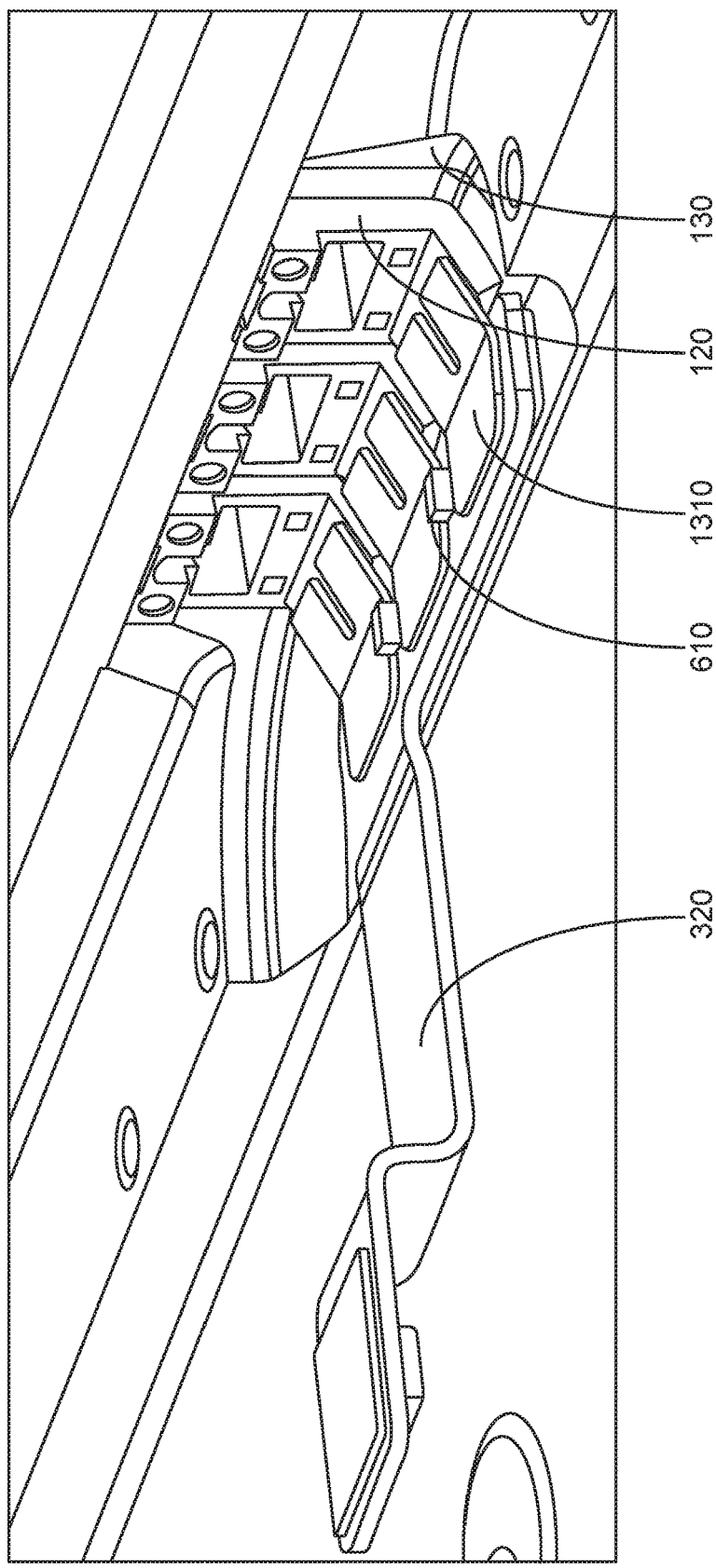
FIG. 16 illustrate an assembled contact structure in a device according to an embodiment of the present invention.

FIG. 16 illustrates an assembled contact structure according to an embodiment of the present invention. A number of contacts 112 (not shown) in insulators 120 may be mated to flexible circuit board 320 according to an embodiment of the present invention. Contacts on flexible circuit board 320 may be attached to rear portions 114 of contacts 112 (as shown in FIG. 9) by soldering, laser, spot, or resistance welding, or by other method. Diodes 610 may be connected between flexible circuit board traces in flexible circuit board 320 and the device enclosure 130 to provide ESD protection. In this example, flexible circuit board 320 may be routed laterally along the backside of contacts 112 to gain flexibility in attaching flexible circuit board 320 to bridging pieces 1310.

FIG. 17 illustrates another contact according to an embodiment of the present invention. This contact 112 may include a contacting portion emerging from a front face 113. Contacts 112 may further have a rear angle portion 114 that may connect to flexible circuit board 320.

Contact 112 may be formed by machining, forging, printing, etching, stamping, or in other ways. In other embodiment of the present invention, contacts 112 may be formed by a deep drawn process.

Figure 18:
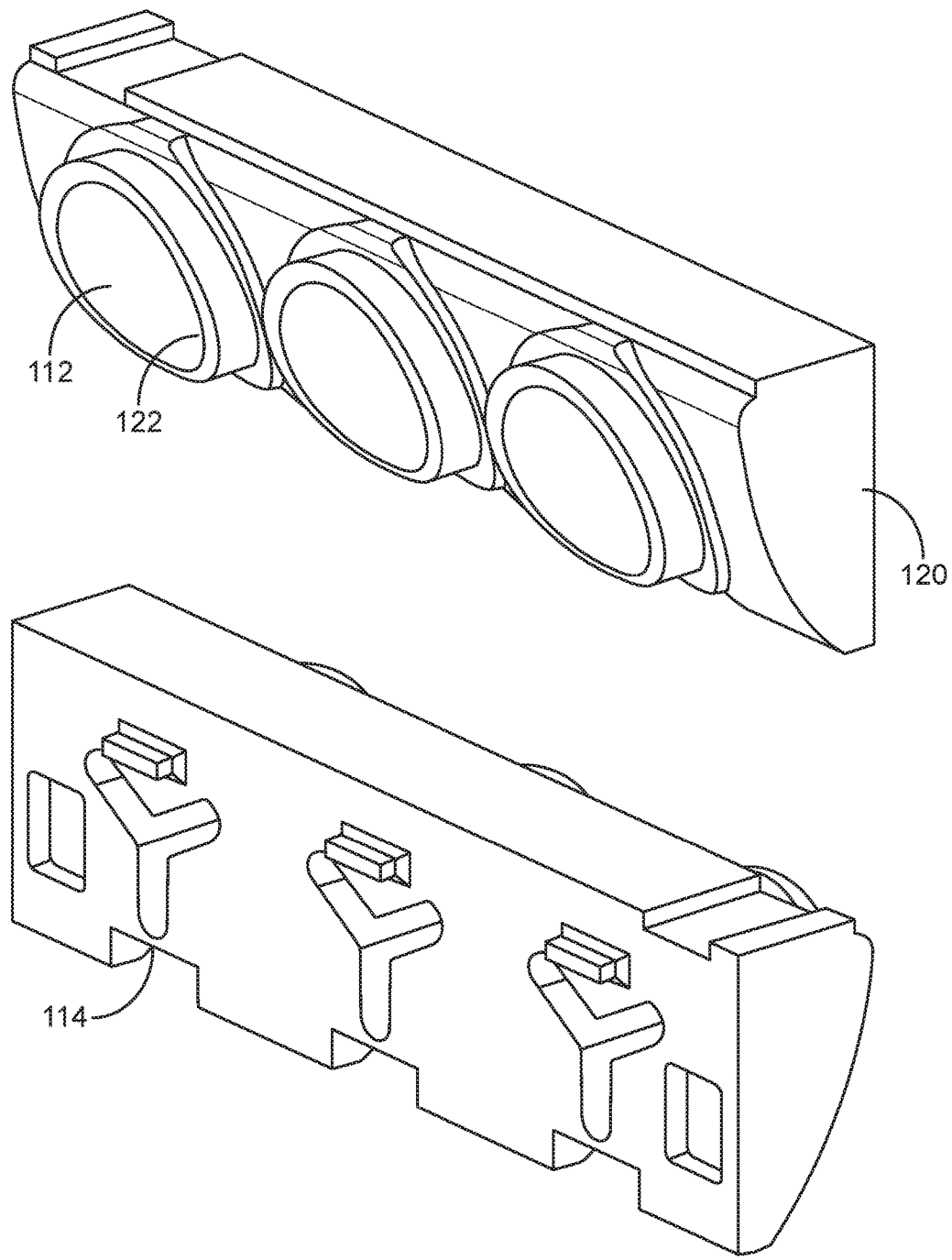
FIG. 18 illustrates contacts of FIG. 17 in a plastic insulator according to an embodiment of the present invention.

FIG. 18 illustrates contacts of FIG. 17 in a plastic insulator according to an embodiment of the present invention. In this example, plastic insulator 120 may have openings 122 for accepting contacts 112. Rear contact portions 114 (not shown) may extend from insulator 120.

Figure 19:
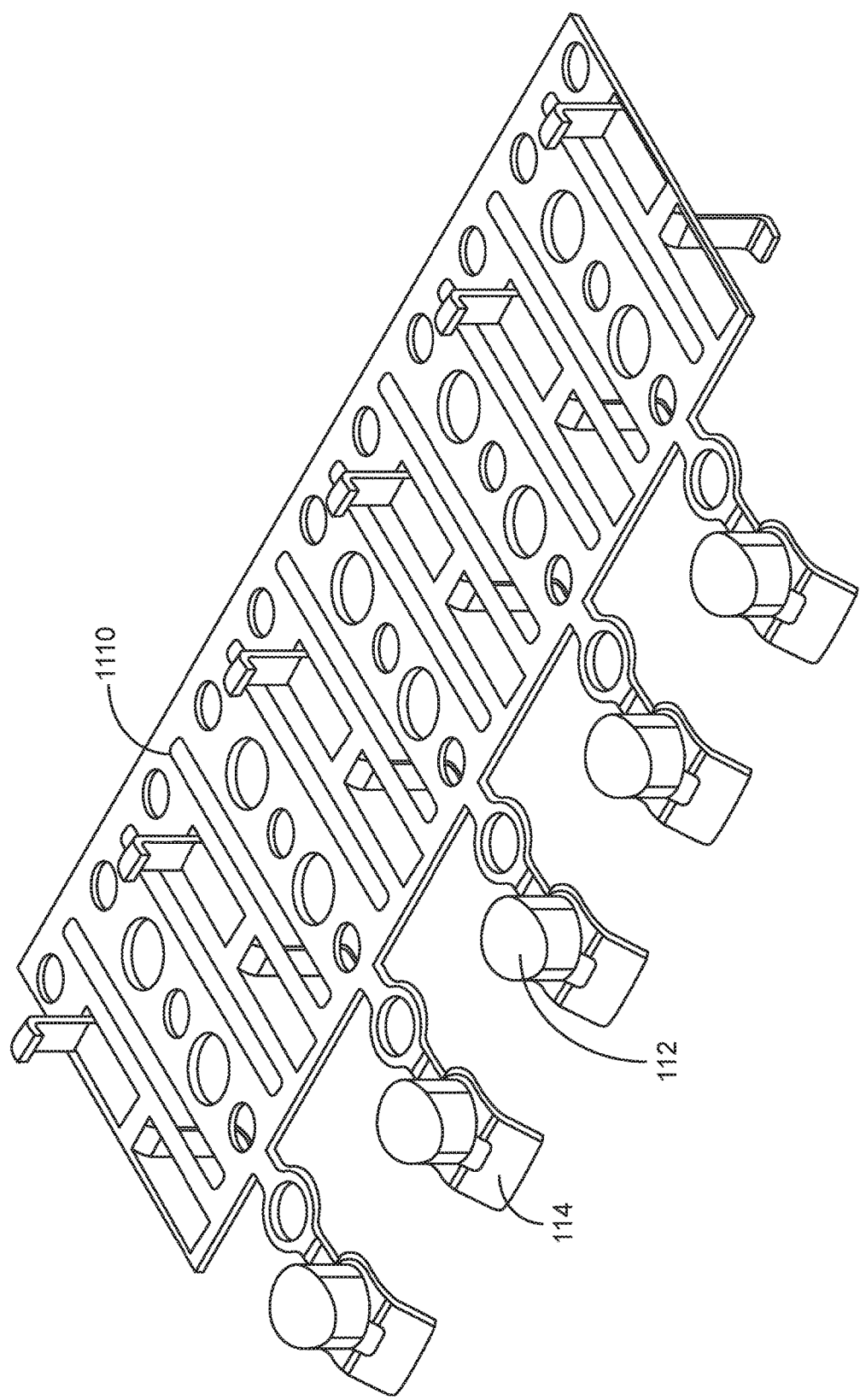
FIGS. 19-24 illustrate a method of assembling a contact structure in a device according to an embodiment of the present invention.
Figure 20:
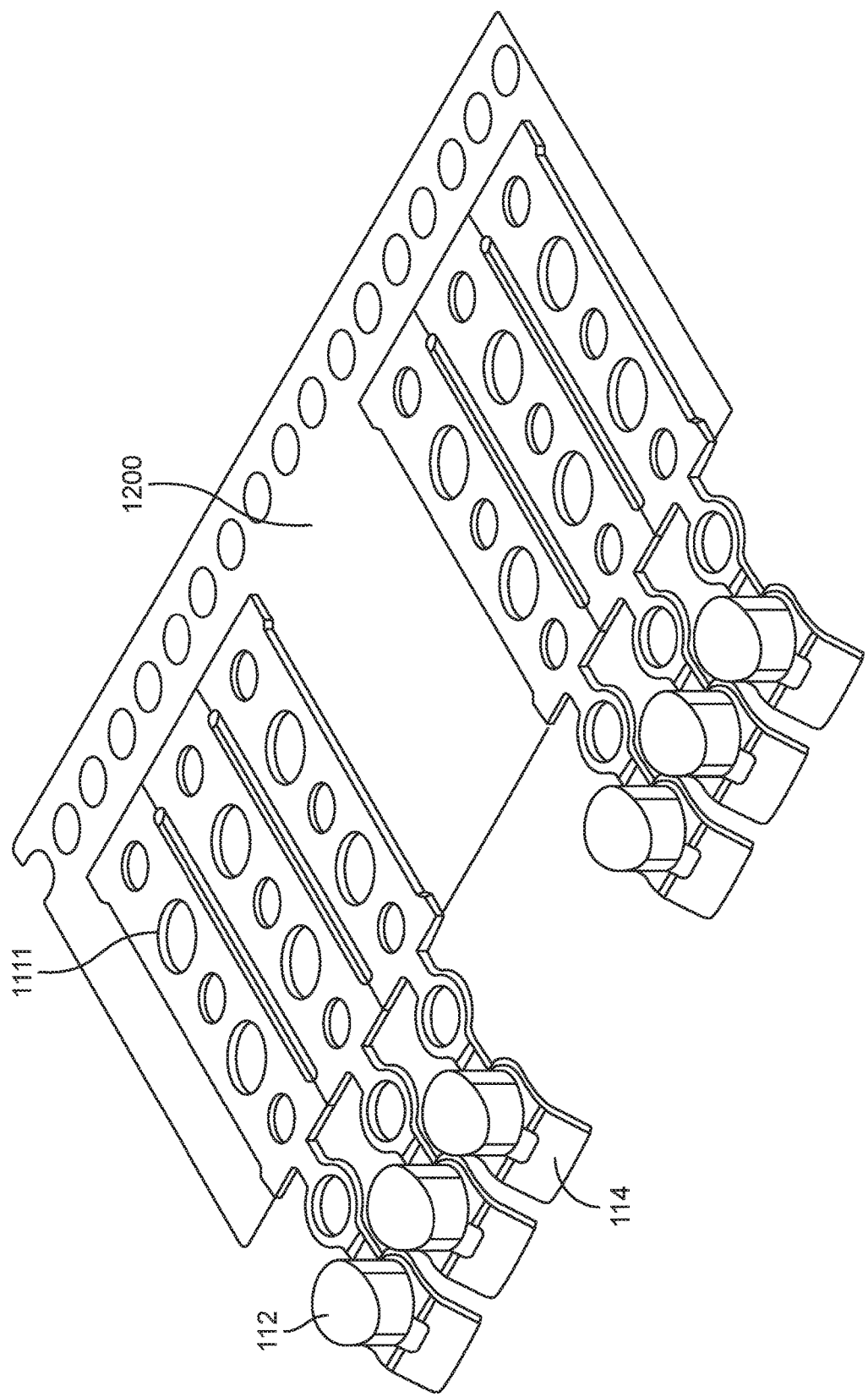
Figure 21:
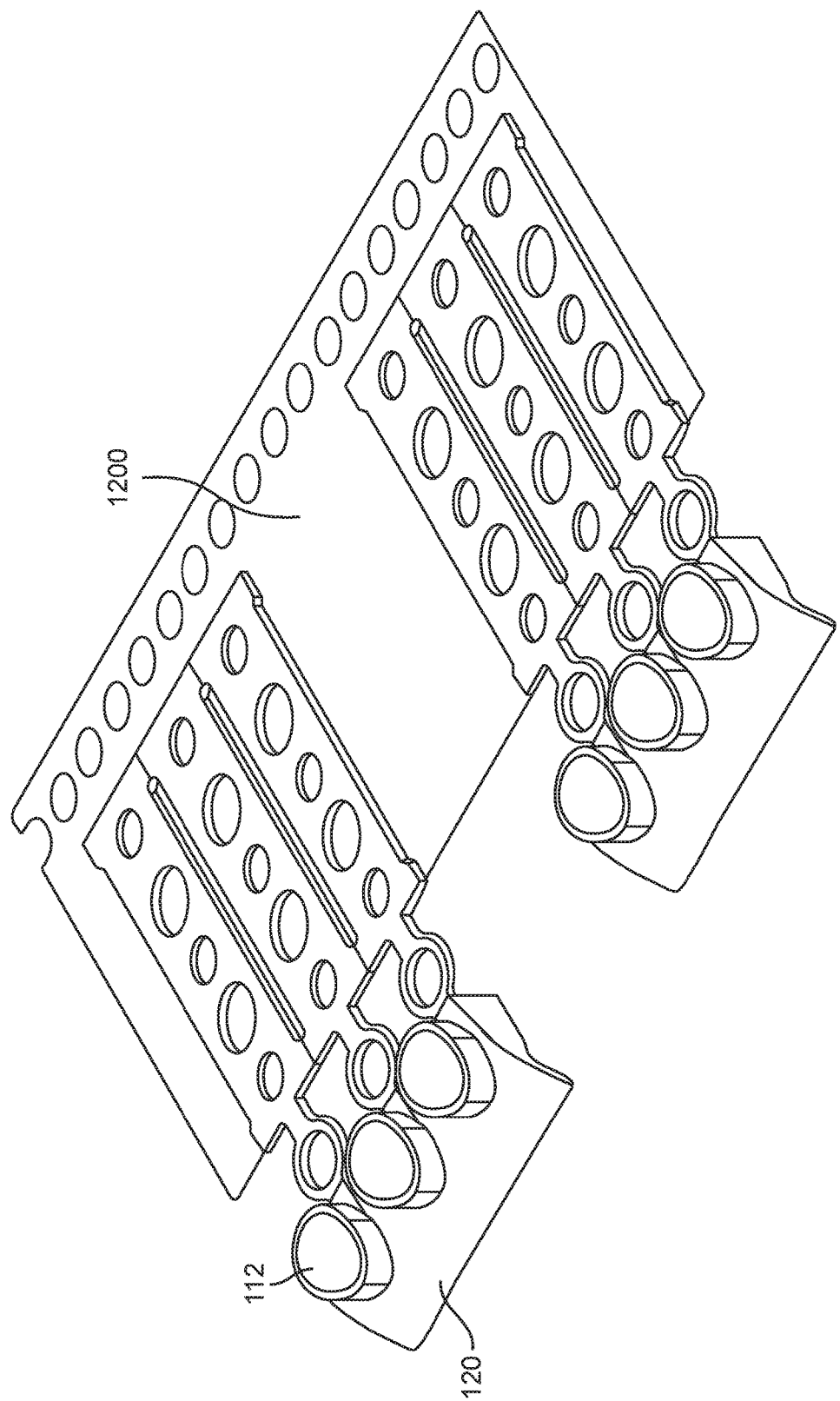

FIGS. 19-24 illustrate a method of making another contact structure according to an embodiment of the present invention. In FIG. 19, a plurality of contacts 112 may be stamped at ends of carrier 1110. Each contact 112 may include a rear angled portion 114. The contacts may be blasted and plated. In FIG. 20, portions 1111 of the carrier 1110 may be split and placed on a dummy carrier 1200 such that contacts 112 may have the same special relationship to each other as they will when placed in a device enclosure. In FIG. 21, plastic insulators 120 may be formed around contacts 112. In other embodiments of the present invention, plastic insulators 120 may be formed in a separate step and then placed around contacts 112. In these and other embodiments of the present invention, instead of one plastic insulator 120, three plastic insulators or insulators may be used, each around one of the contacts 112. Plastic insulators 120 may be glued or otherwise fixed to contacts 112. The dummy carrier 1200 may be removed.

Figure 22:
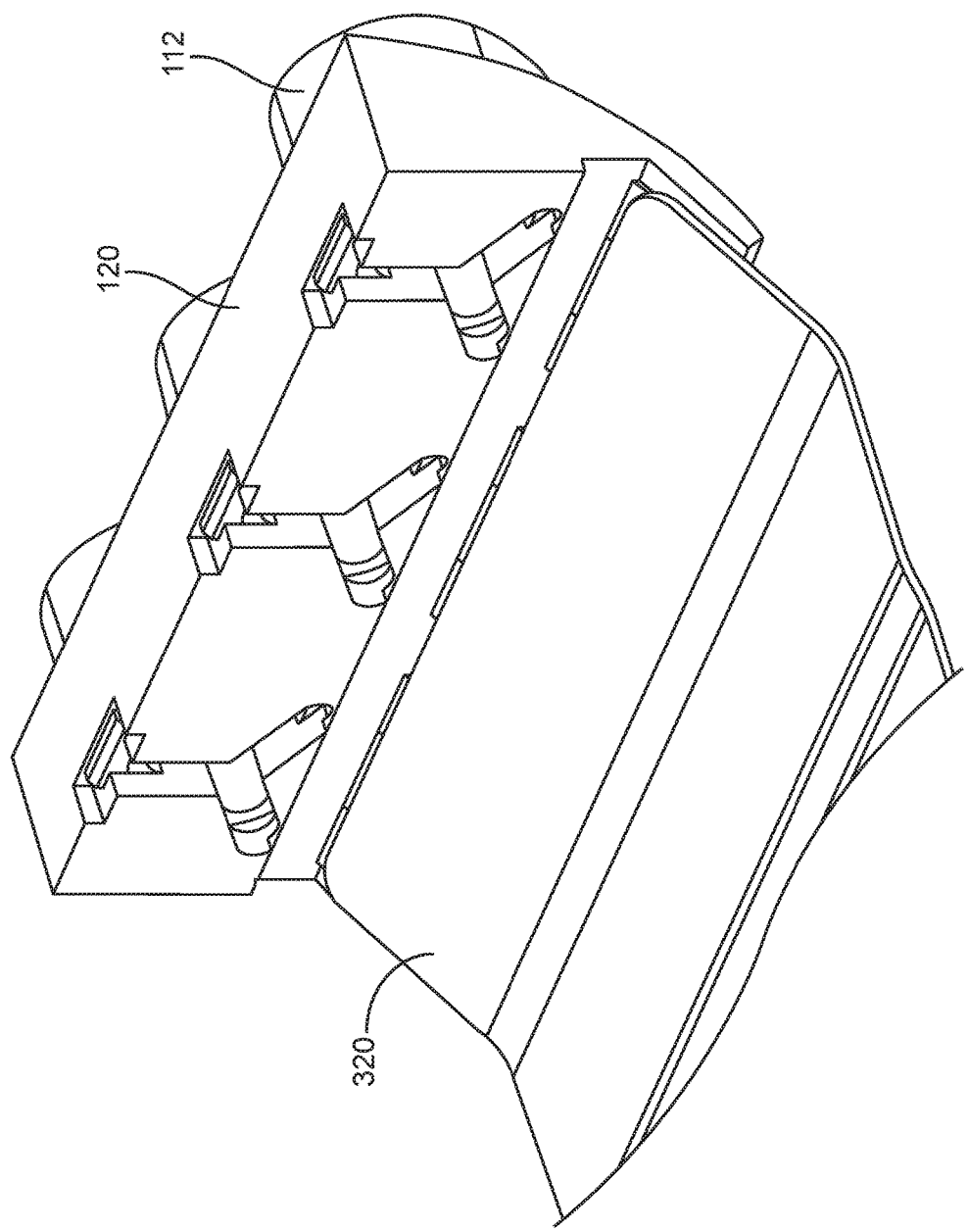
Figure 23:
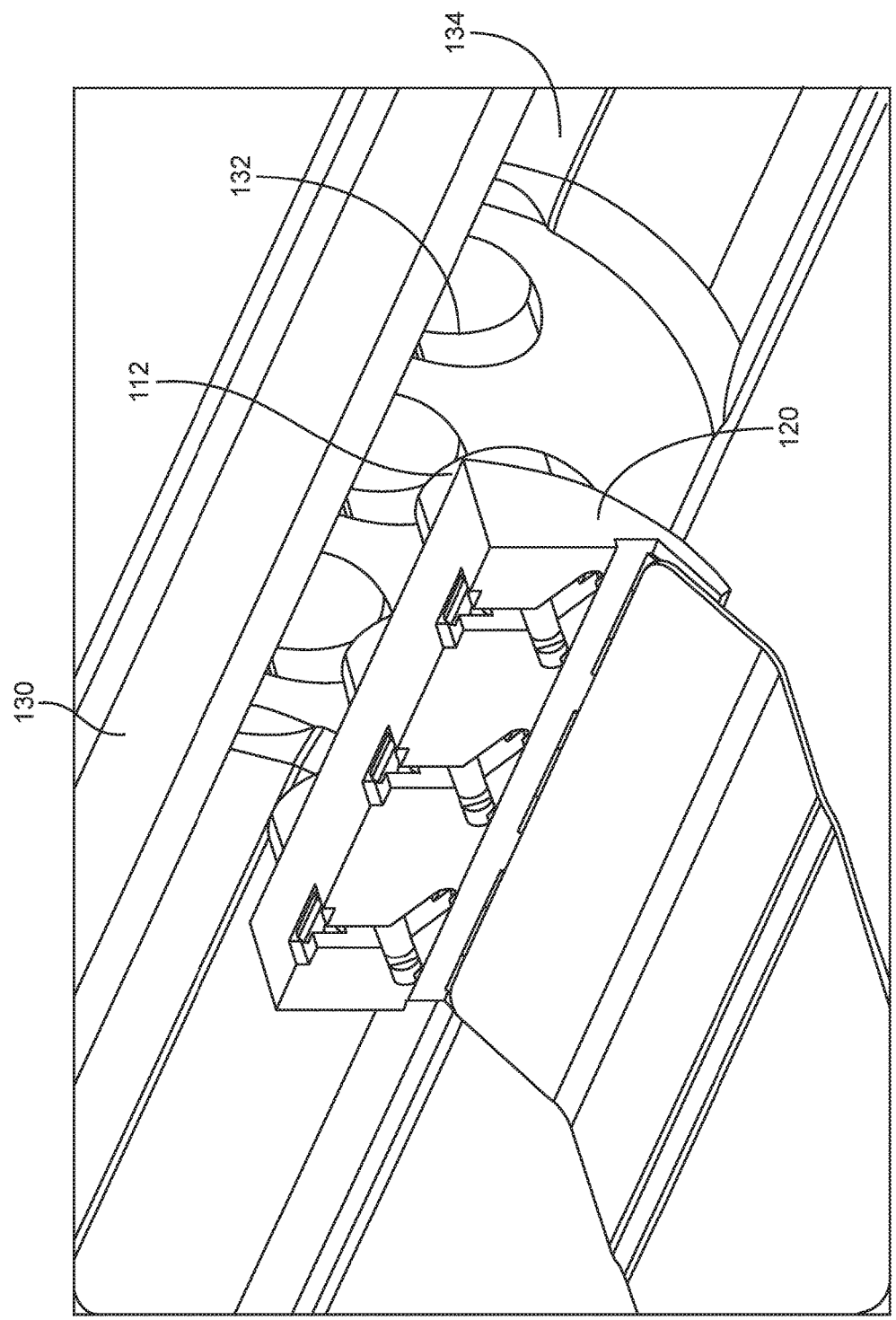
Figure 24:
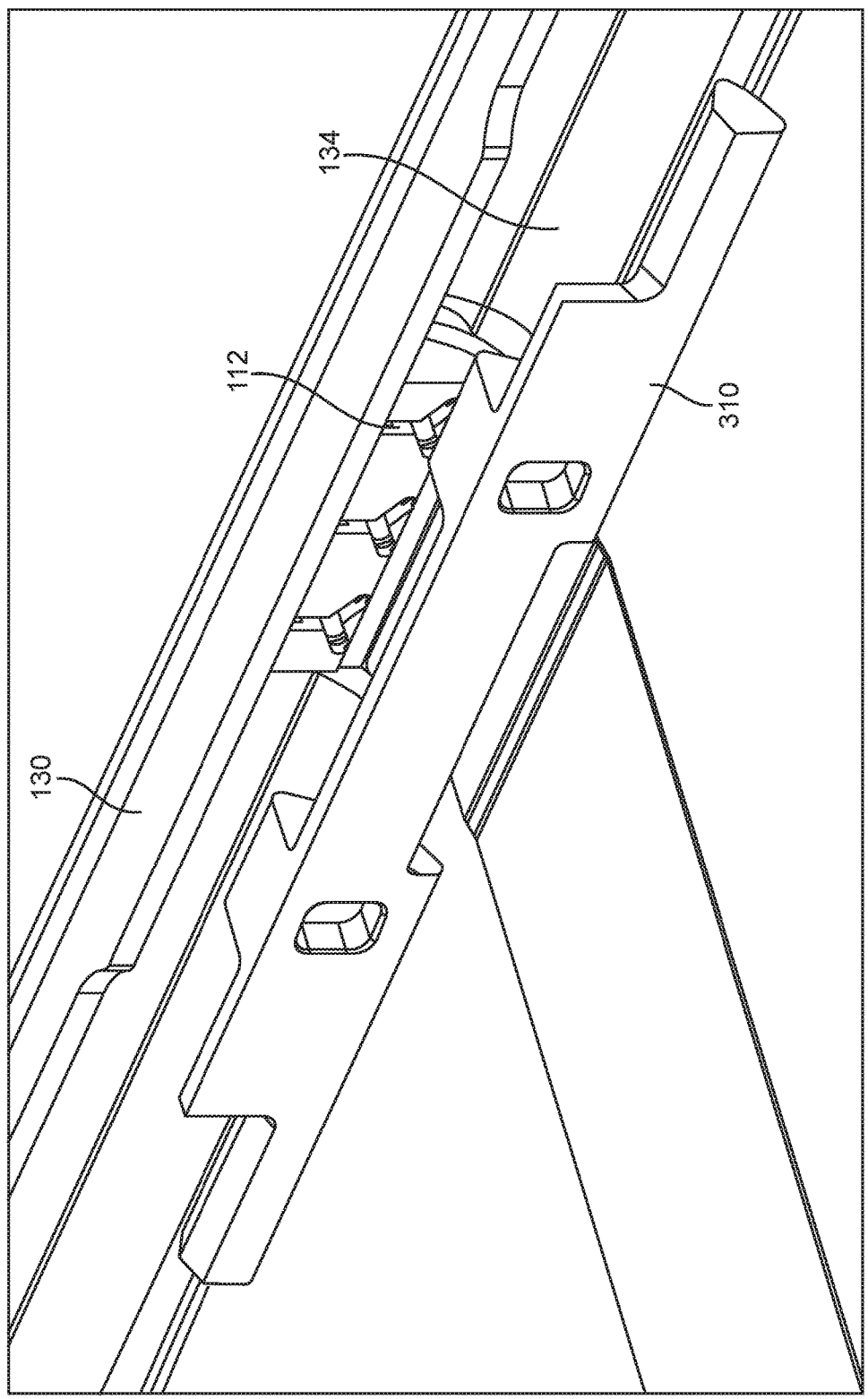

In FIG. 22, flexible circuit board 320 may be attached, for example by soldering, to rear angled pieces 114 of contacts 112. Contacts 112 may be insulated by plastic insulator 120. In FIG. 23, contacts 112 may be aligned with openings 132 in device enclosure 130. Plastic insulating piece 120 may be arranged to fit in notch 134 in device enclosure 130 and may be glued in place. In FIG. 24, bracket 310 may be placed behind contacts 112 in notch 134 of device enclosure 130 to secure contacts 112 in place. Bracket 310 may be glued in place to further secure contacts 120 to device enclosure 130.

Figure 25:
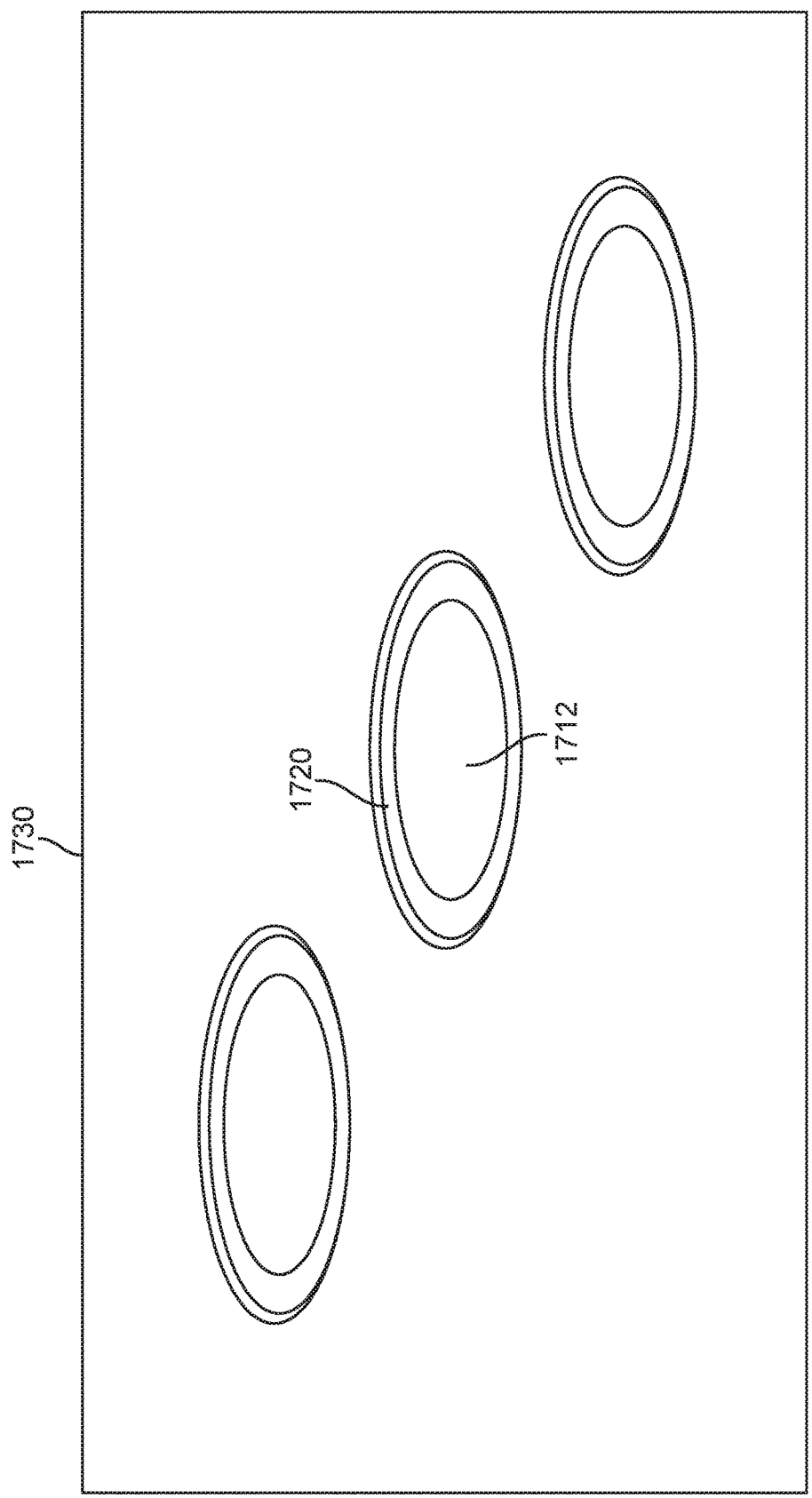
FIG. 25 illustrates a contact structure in a device enclosure according to an embodiment of the present invention.

FIG. 25 illustrates a contact structure in a device enclosure according to an embodiment of the present invention. In this example, contacts 1712 may be located at a surface of device enclosure 1730. An insulating ring formed by a plastic insulator 1720 may surround an outside edge of contacts 1712 and may be located between contacts 1712 and device enclosure 1730. In these and other embodiments the present invention, contacts 1712 and the insulating ring formed by plastic insulator 1720 may be substantially flush with, or recessed a limited amount relative to, a surrounding surface of device enclosure 1730. These surfaces may be curved, they may be substantially flat, or they may have other contours.

Figure 26:
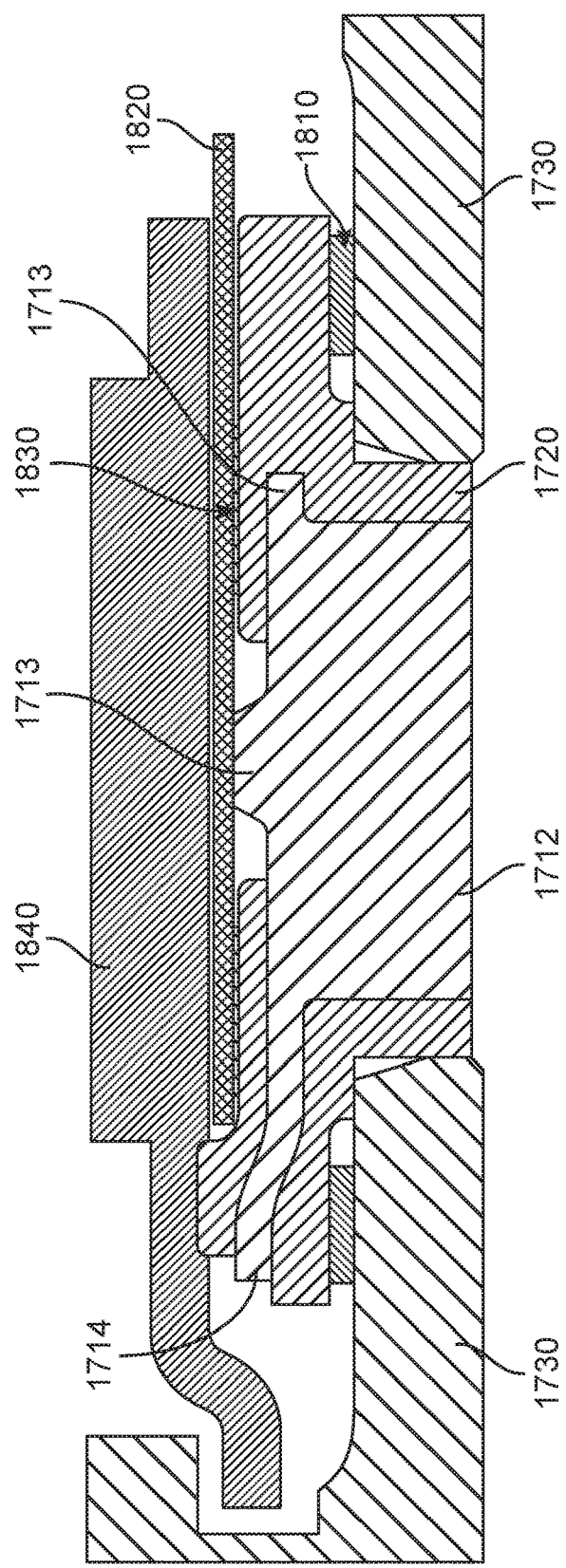
FIG. 26 illustrates a cutaway side view of a contact structure that may be used for the contact structure of FIG. 25.

FIG. 26 illustrates a cutaway side view of a contact structure that may be used as the contact structure of FIG. 25. Again, contacts 1712 may be located in openings in device enclosure 1730. Plastic insulator 1720 may be located between contact 1712 and device enclosure 1730. A surface of contact 1712 and a surface of plastic insulator 1720 may be substantially flush with, or recessed a limited amount relative to, a surface of device enclosure 1730. These surfaces may be curved, substantially flat, or they may have other contours. A silicone gasket or other seal 1810 may be located between plastic insulator 1720 and device enclosure 1730. Silicone gasket 1810 may prevent the ingress of liquids, moisture, or debris into the electronic device. Contacts 1712 may include a contacting portion 1713 that may be soldered or otherwise attached to a trace on flexible circuit board 1820. A heat-activated film or adhesive 1830 may be used to fix flexible circuit board 1820 to plastic insulator 1720. Contact 1712 may further include tabs 1713 (of which contacting portion 1713 may be one of) and handle 1714. Bracket 1840 may be located behind flexible circuit board 1820 and may hold contact 1712 in place in device enclosure 1730.

In various embodiments of the present invention, it may be desirable that a surface of contacts in a contact structure to be at least substantially flush with, or recessed a limited amount relative to, a surface of a device housing the contacts. But the sizes of the various components of this connector structure each have a manufacturing tolerance associated with them. The accumulation of these tolerances may lead to the surface of one or more contacts not being flush with a surface of the device. Accordingly, embodiments of the present invention may employ shims or other adjustments features to account for the errors that these tolerances may create. An example is shown in the following figure.

Figure 27:
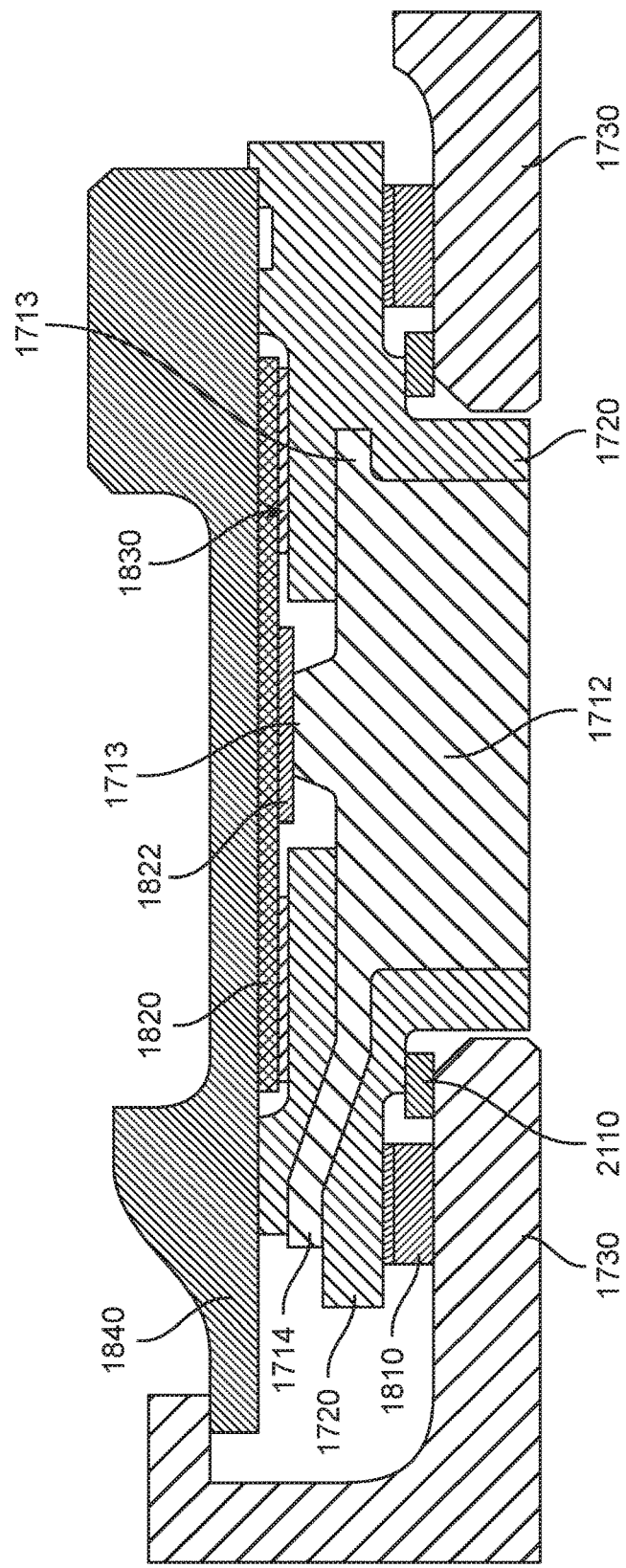
FIG. 27 illustrates a cutaway side view of another contact structure that may be used for the contact structure of FIG. 25.

FIG. 27 illustrates a cutaway side view of a contact structure that may be used as the contact structure of FIG. 25. Again, contacts 1712 may be located in openings in device enclosure 1730. Plastic insulator 1720 may be located between contact 1712 and device enclosure 1730. A surface of contact 1712 and a surface of plastic insulator 1720 may be substantially flush with, or recessed a limited amount relative to, a surface of device enclosure 1730. The surface of contact 1712, the surface of plastic insulator 1720, and the surface of device enclosure 1730 may be curved, substantially flat, or they may have other contours. A silicone gasket or other seal 1810 may be located between plastic insulator 1720 and device enclosure 1730. Silicone gasket 1810 may prevent the ingress of liquids, moisture, or debris into the electronic device. Contacts 1712 may include a contacting portion 1713 that may be soldered or otherwise attached to a trace or contact 1822 on flexible circuit board 1820. A heat-activated film or adhesive 1830 may be used to fix flexible circuit board 1820 to plastic insulator 1720. Contact 1712 may further include tabs 1713 (of which contacting portion 1713 may be one of) and handle 1714. Bracket 1840 may be located behind flexible circuit board 1820 and may hold contact 1712 in place in device enclosure 1730.

Again, it may be desirable that the surface of contact 1712 and a surface of plastic insulator 1720 be substantially flush with, or recessed a limited amount relative to, a surface of device enclosure 1730. But the sizes of the various components of this connector structure each have a manufacturing tolerance associated with them. The accumulation of these tolerances may lead to the surface of one or more contacts 1712 not being flush with a surface 1730 of the device. Accordingly, embodiments of the present invention may employ shims 2110. Shim 2110 may be selected from a set of shims having different sizes. Shim 2110 may have a size that is selected to compensate for the accumulated tolerances of the sizes of the different components in this connector structure such that the surface of contact 1712 and a surface of plastic insulator 1720 may be substantially flush with, or recessed a limited amount relative to, a surface of device enclosure 1730.

Figure 28:
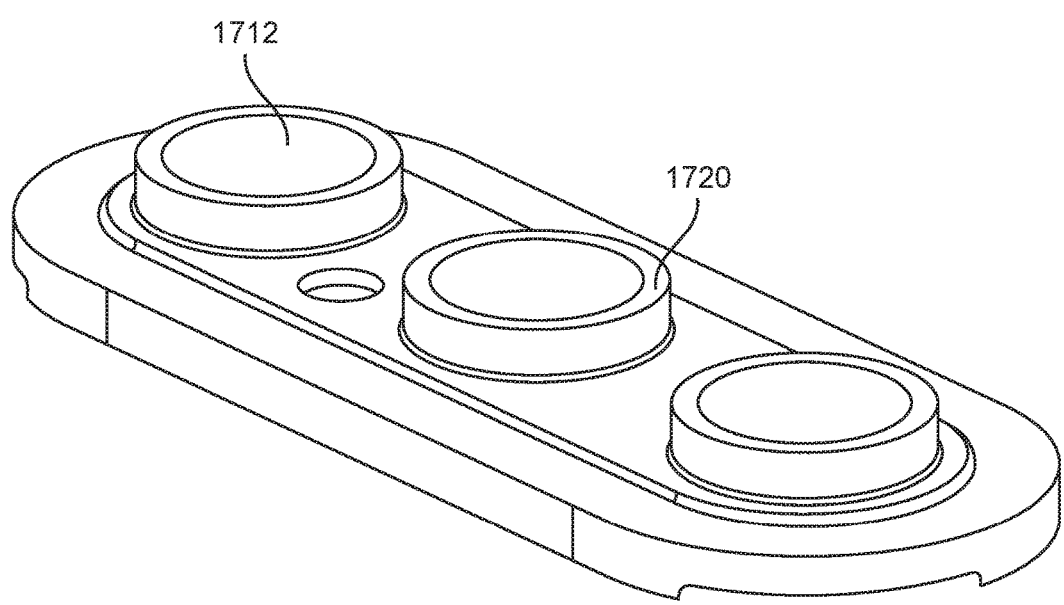
FIG. 28 illustrates a portion of a contact structure according to an embodiment of the present invention.

FIG. 28 illustrates a portion of contact structure according to an embodiment of the present invention. This contact structure portion may include a number of contacts 1712 surrounded by plastic insulator 1720.

Figure 29:
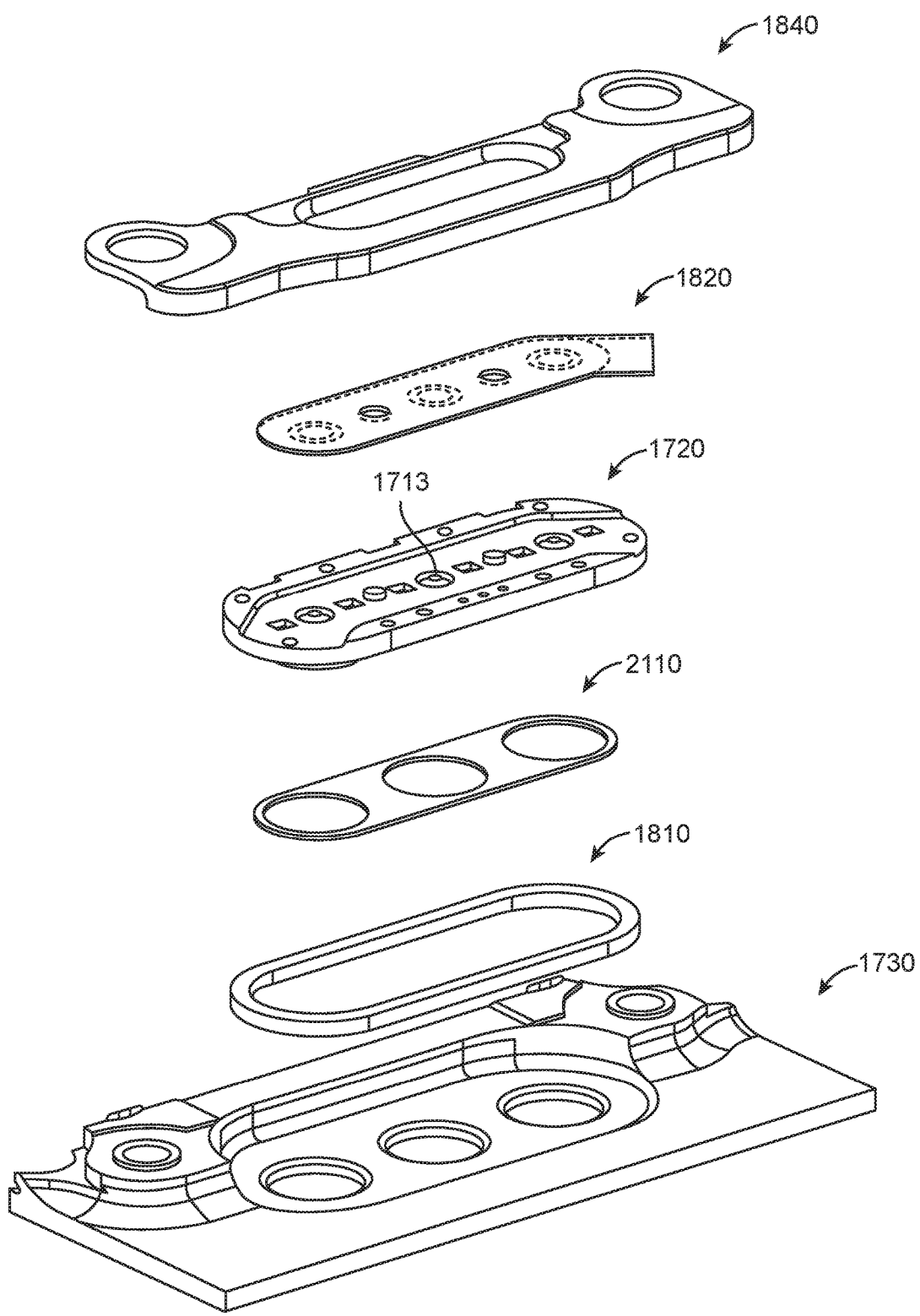
FIG. 29 is an exploded view of a contact structure according to an embodiment of the present invention.

FIG. 29 is an exploded view of a contact structure according to an embodiment of the present invention. Contacts 1712 (shown in FIG. 28) may be housed in plastic insulator 1720, and may be located in openings in device enclosure 1730. A silicone gasket or other seal 1810 may be located between plastic insulator 1720 and device enclosure 1730. Silicone gasket 1810 may prevent the ingress of liquids, moisture, or debris into the electronic device. Contacts 1712 may include a contacting portion 1713 (shown in FIG. 18) that may be soldered or otherwise attached to a trace on flexible circuit board 1820. A heat-activated film or adhesive (not shown) may be used to fix flexible circuit board 1820 to plastic insulator 1720. Bracket or cowling 1840 may be located behind flexible circuit board 1820 and may hold contacts 1712 in place in device enclosure 1730. Shim 2110 may be placed between plastic insulator 1720 and device enclosure 1730. Shim 2110 may be selected from a set of shims having different sizes. Shim 2110 may have a size that is selected to compensate for the accumulated tolerances of the sizes of the different components in this connector structure such that the surface of contact 1712 and a surface of plastic insulator 1720 may be substantially flush with, or recessed a limited amount relative to, a surface of device enclosure 1730.

These contacts structures portions including contacts 1712 and plastic insulators 1720 may be formed in various ways. Examples are shown in the following figures.

Figure 30:
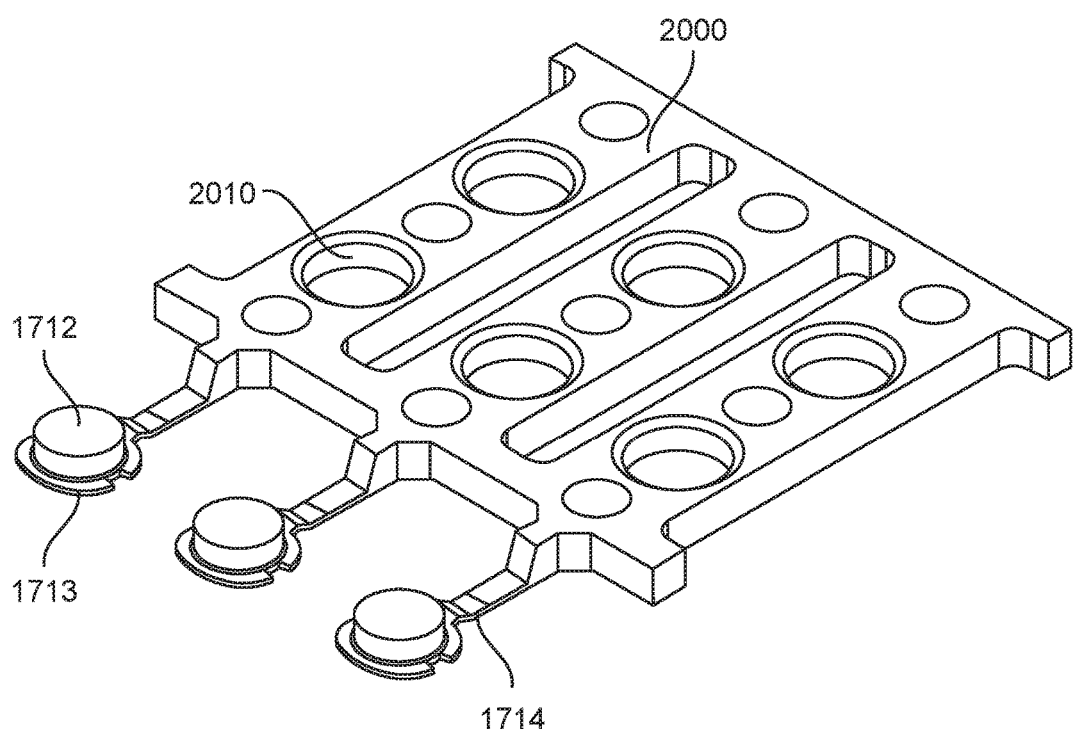
FIGS. 30-33 illustrates a method of manufacturing a portion of a contact structure according to an embodiment of the present invention.
Figure 31:
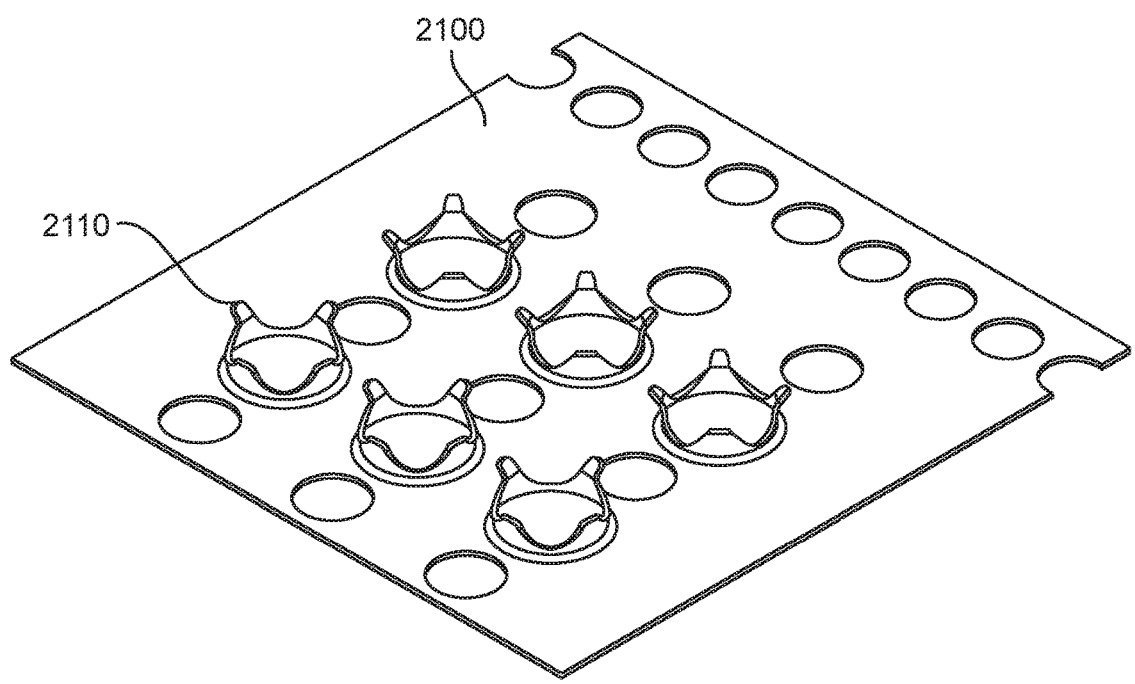
Figure 32:
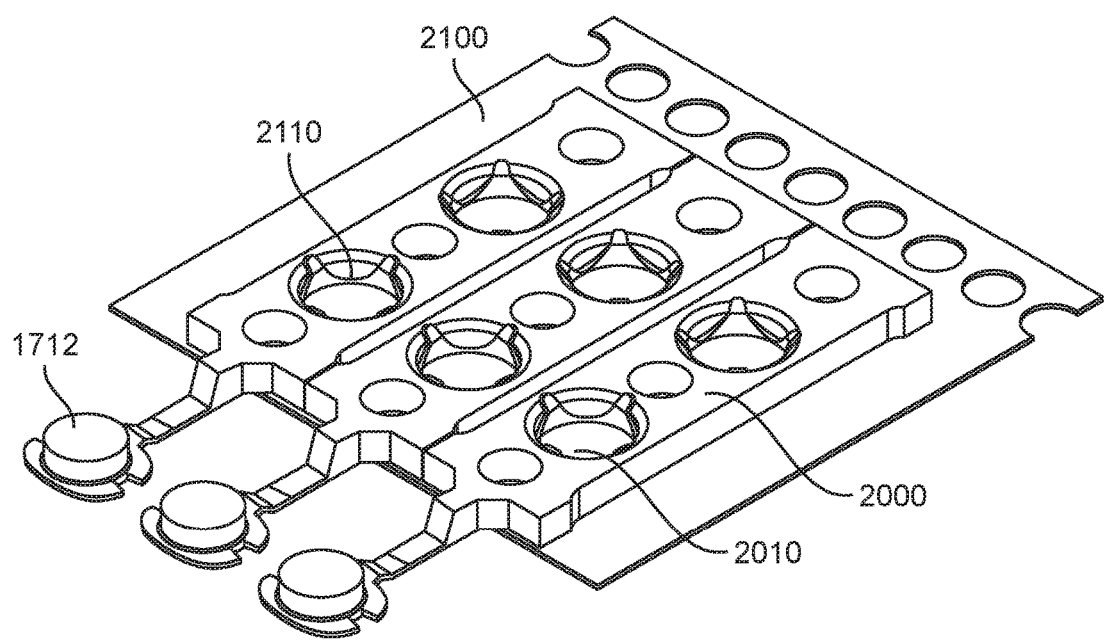
Figure 33:
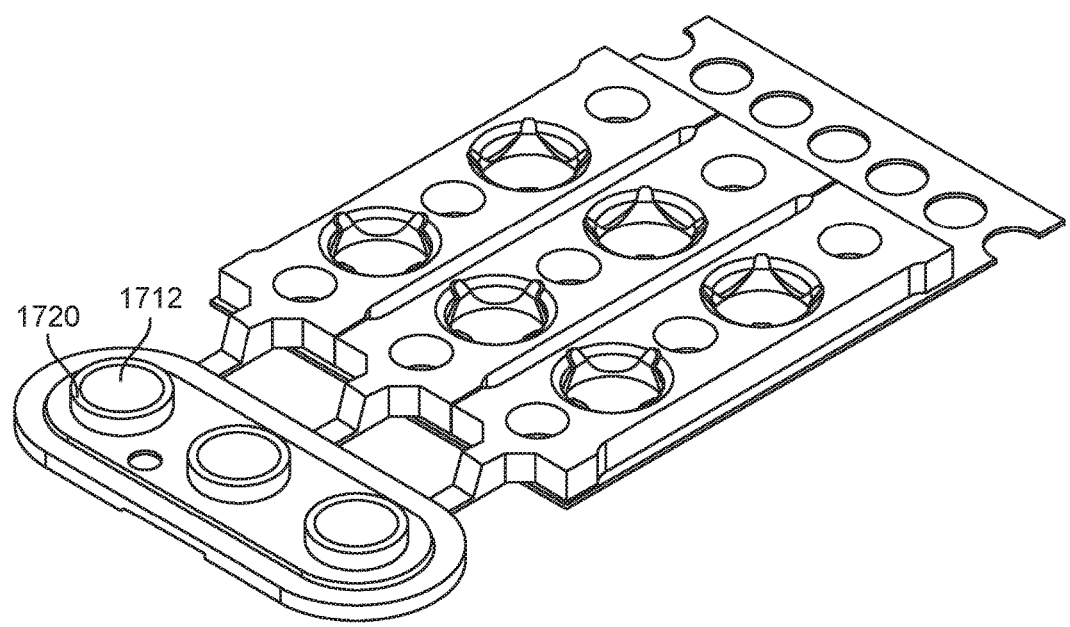

FIGS. 30-33 illustrates a method of manufacturing a portion of a contact structure according to an embodiment of the present invention. In FIG. 30, contacts 1712 may be coined. The coining process may leave tab 1713 and handle 1714 in place. Contacts 1712 may be formed at ends of carrier 2000. Carrier 2000 may include openings 2010. In FIG. 31, a carrier 2100 may be provided. Openings 2100 having raised edges may be stamped in carrier 2100. In FIG. 32, carrier 2000 may be fixed to carrier 2100. Specifically, raised edges of opening 2110 may be placed in openings 2010 of carrier 2000. In FIG. 33, plastic insulator 1720 may be formed around contacts 1712. In other embodiments of the present invention, plastic insulator 1720 may be formed elsewhere and glued or otherwise fixed to contacts 7012. The carrier structure may be removed leaving behind handle 1714 (not shown.)

Figure 34:
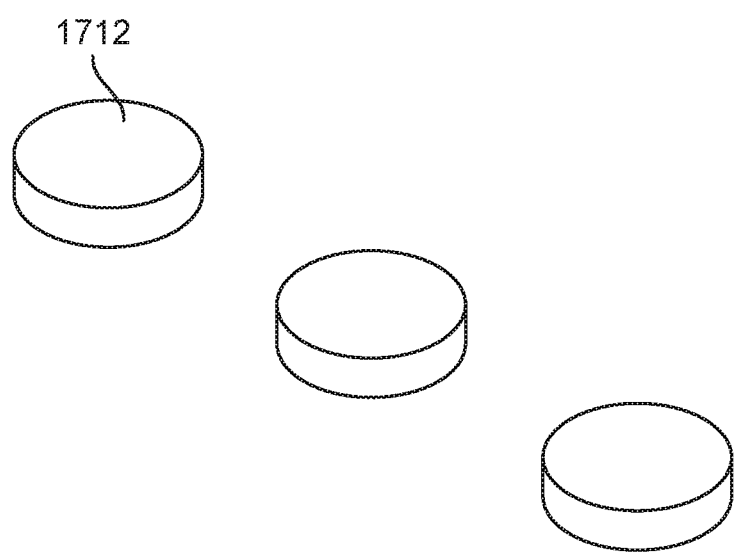
FIGS. 34-37 illustrates another method of manufacturing a portion of a contact structure according to an embodiment of the present invention.
Figure 35:
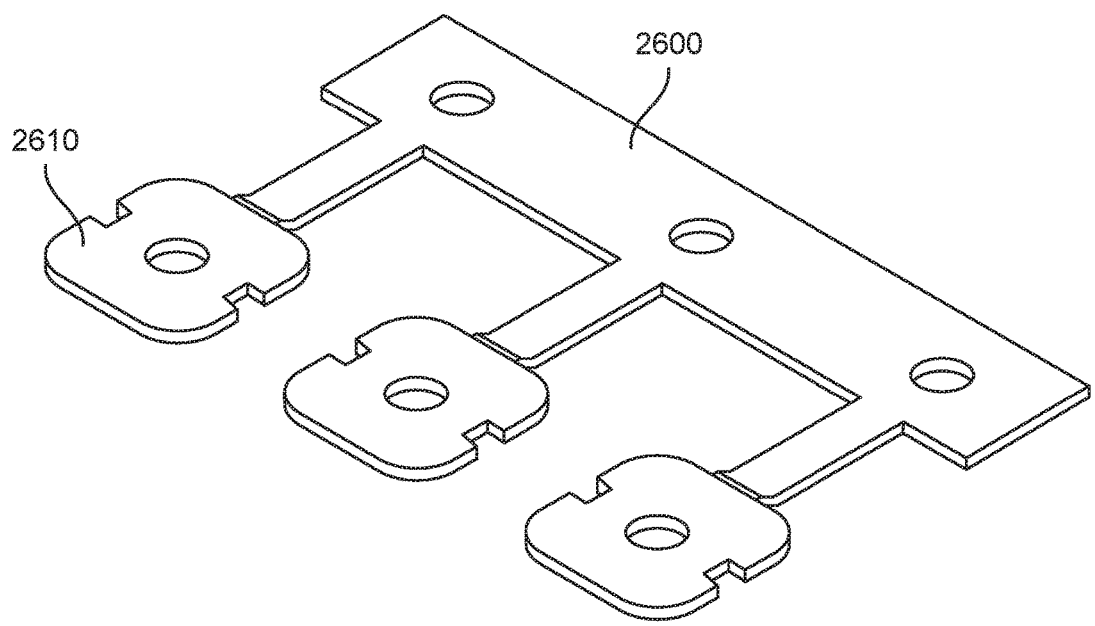
Figure 36:
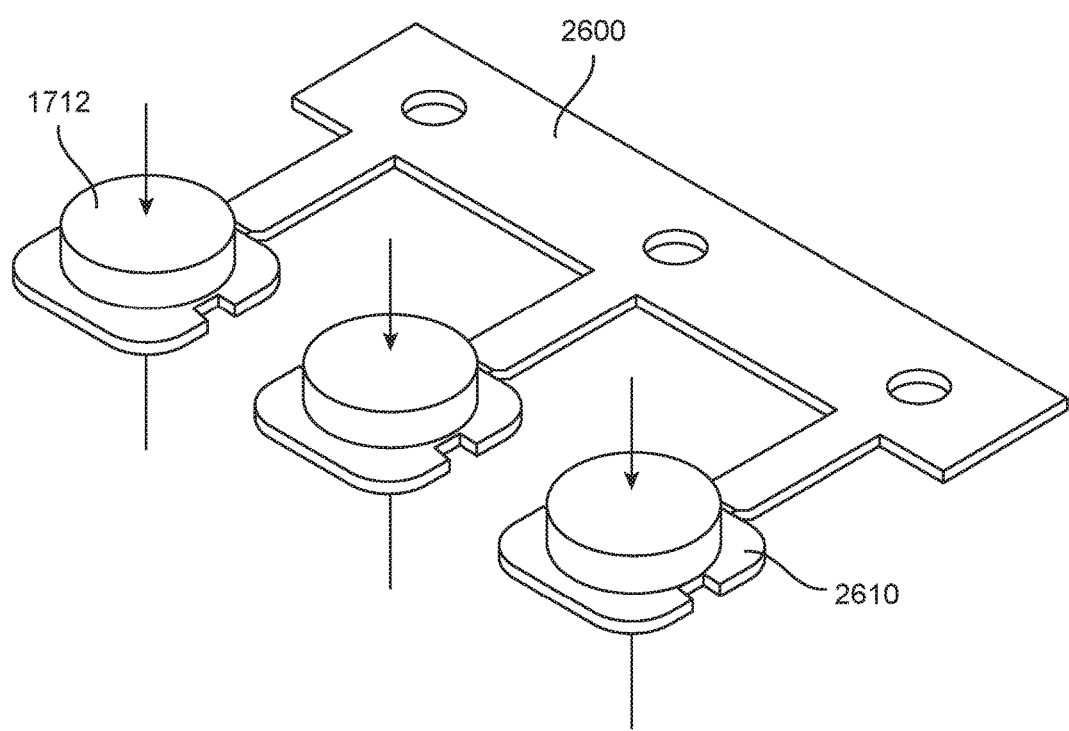
Figure 37:
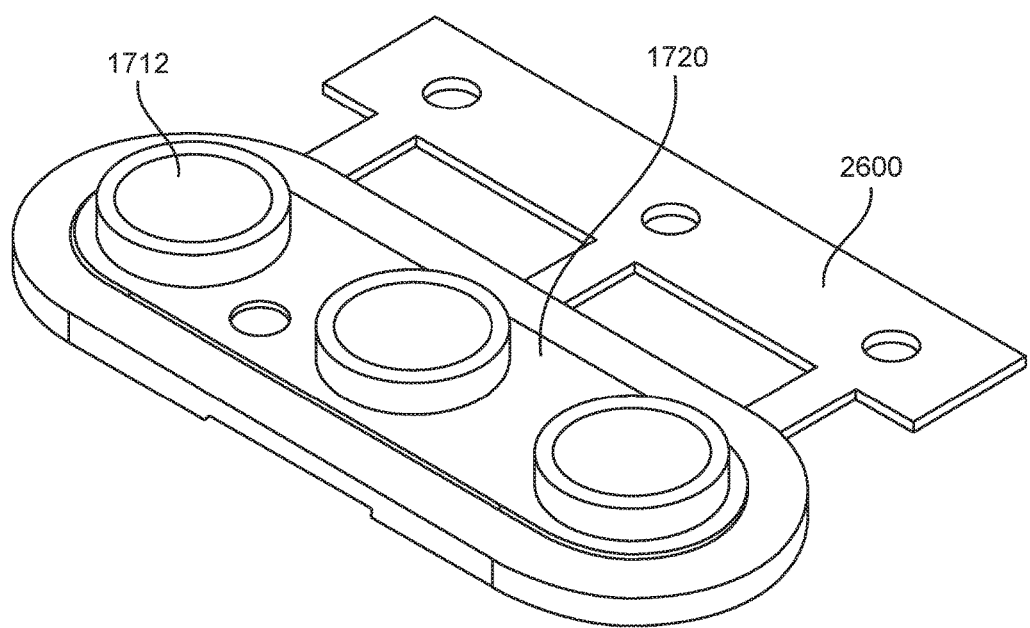

FIGS. 34-37 illustrates another method of manufacturing a portion of a contact structure according to an embodiment of the present invention. In FIG. 34, contacts 1712 may be turned or machined. In FIG. 35, carrier 2600 may be stamped. Carrier 2600 may include paddles 2610. In FIG. 36, contacts 1712 may be attached to paddles 2610 of carrier 2600. In FIG. 37, plastic insulator 7020 may be formed around contacts 1712. In other embodiments of the present invention, plastic insulator 1720 may be formed elsewhere and then fixed to contacts 1712, by using an adhesive or other technique. Carrier 2600 may be removed, again leaving behind handle 1714 (not shown.)

Figure 38:
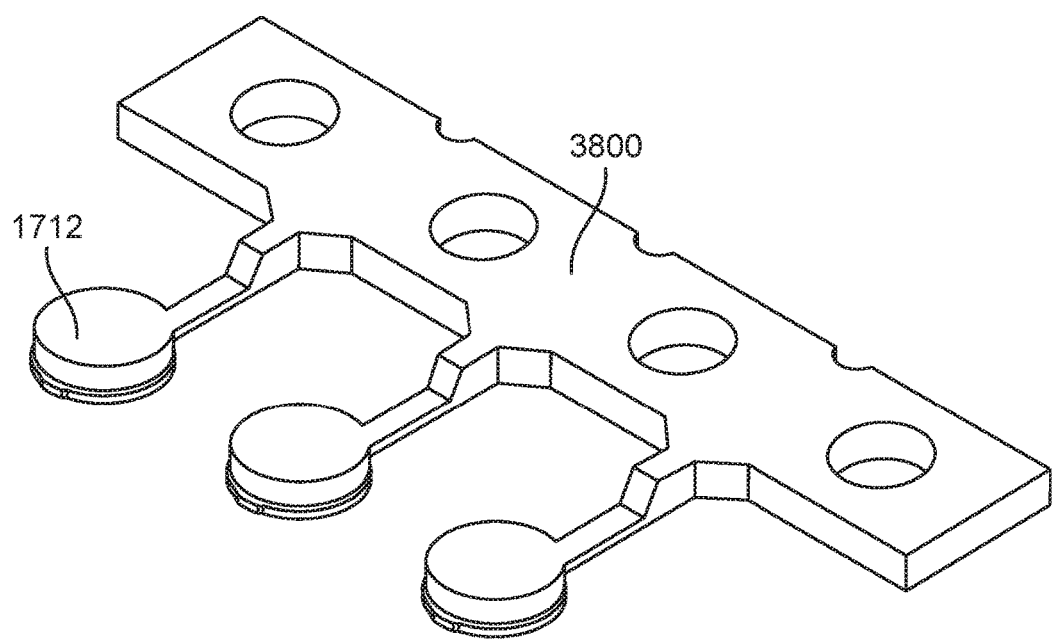
FIGS. 38-42 illustrates a method of manufacturing a portion of a contact structure according to an embodiment of the present invention.
Figure 39:
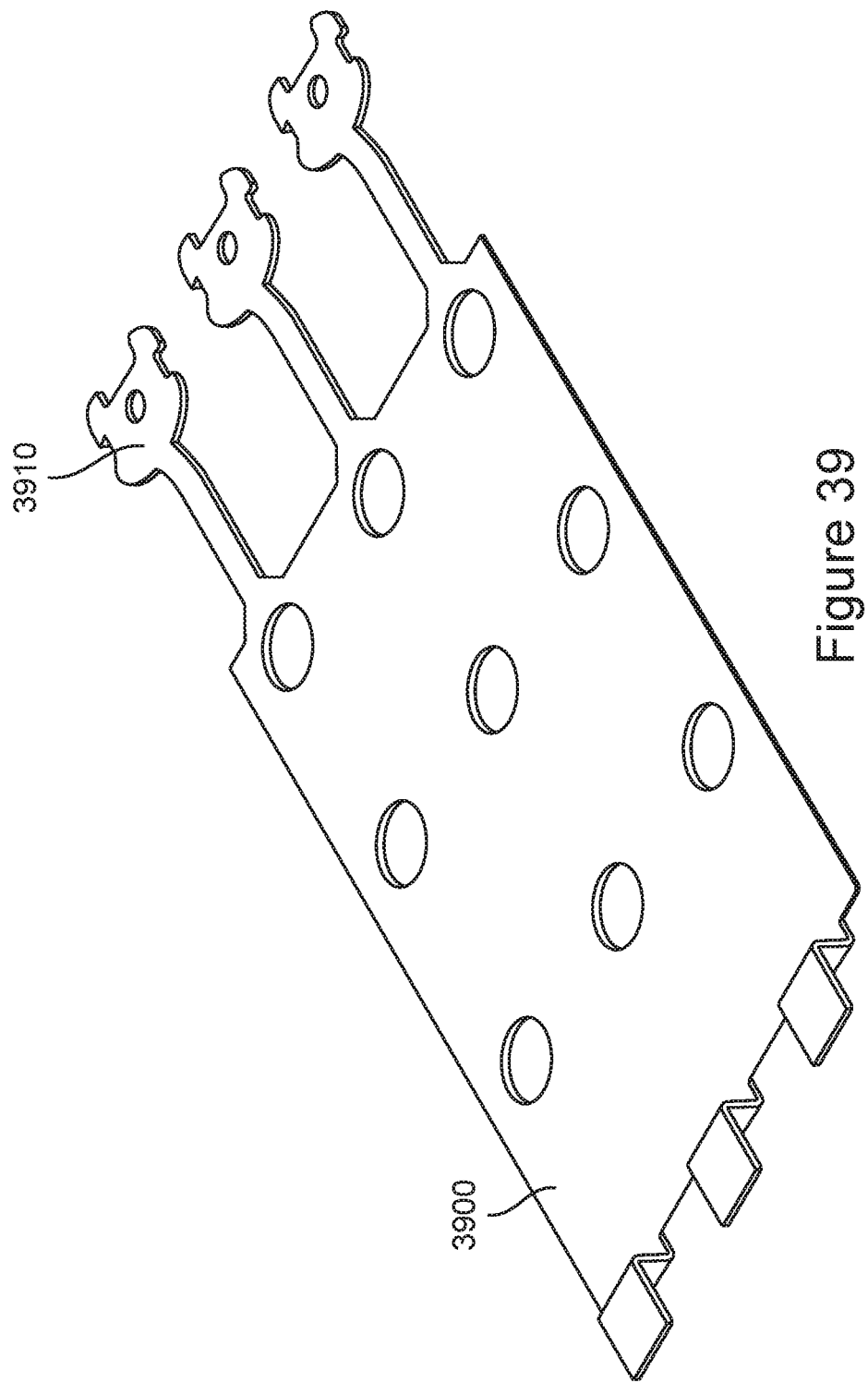
Figure 40:
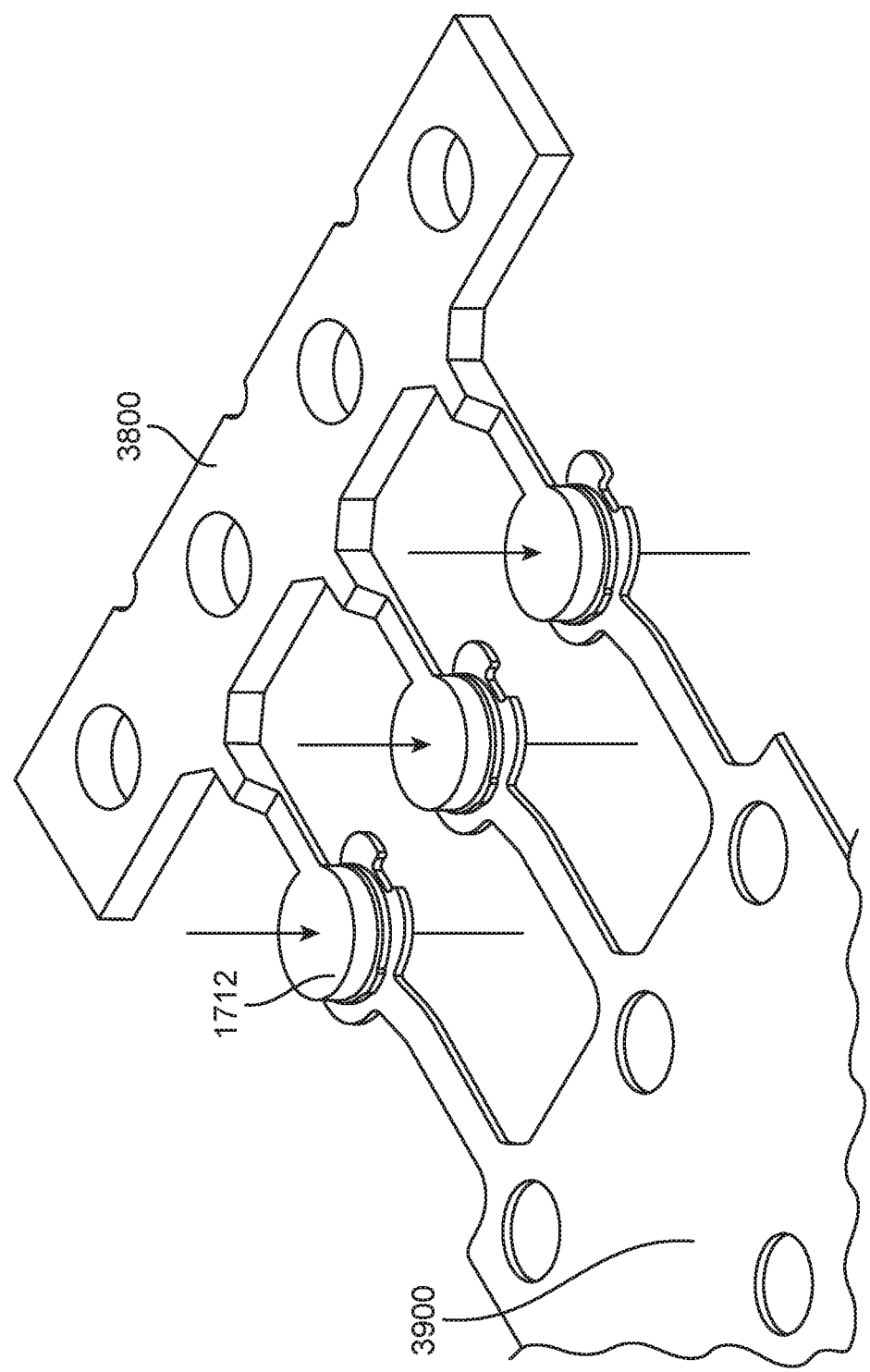
Figure 41:
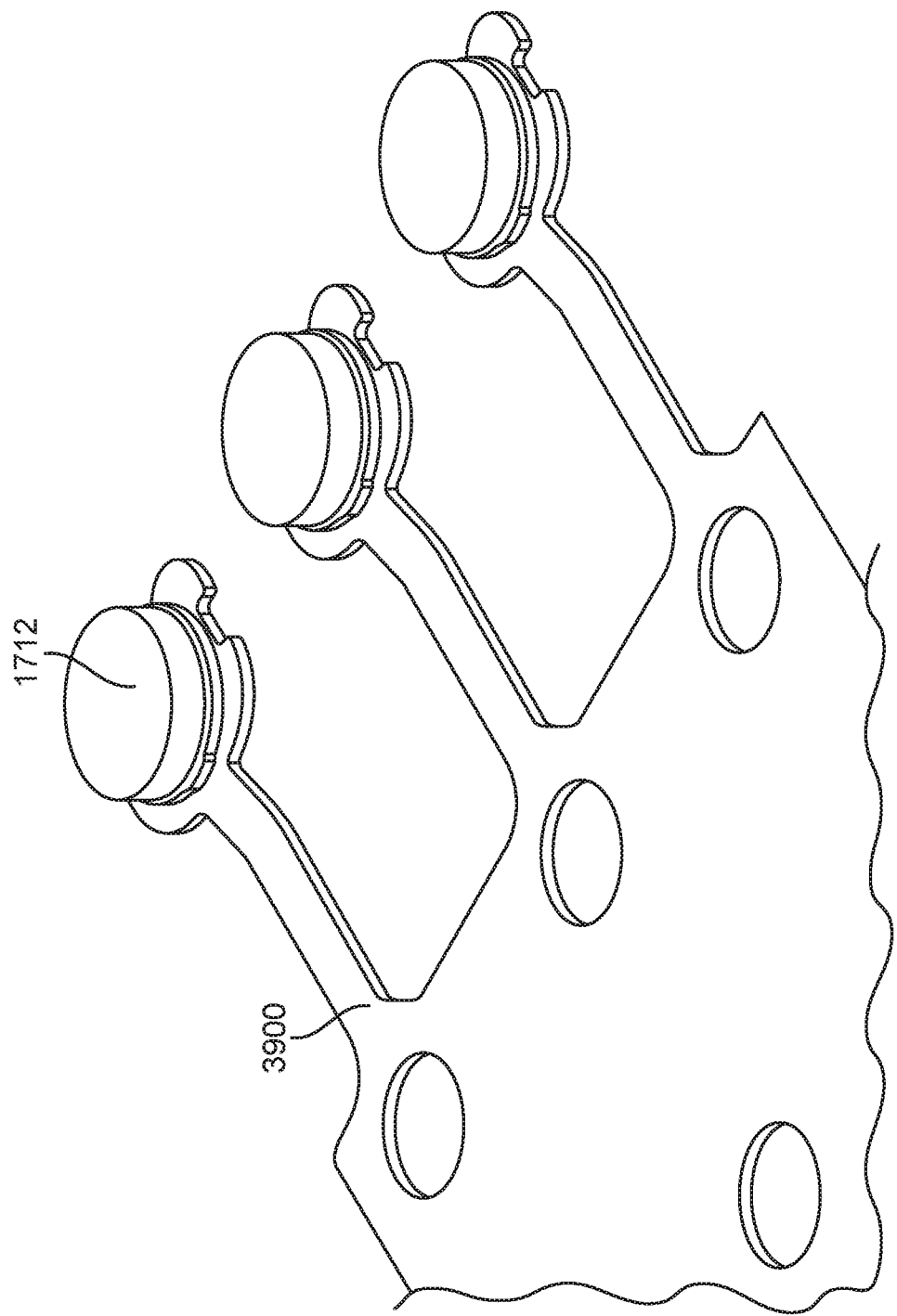
Figure 42:
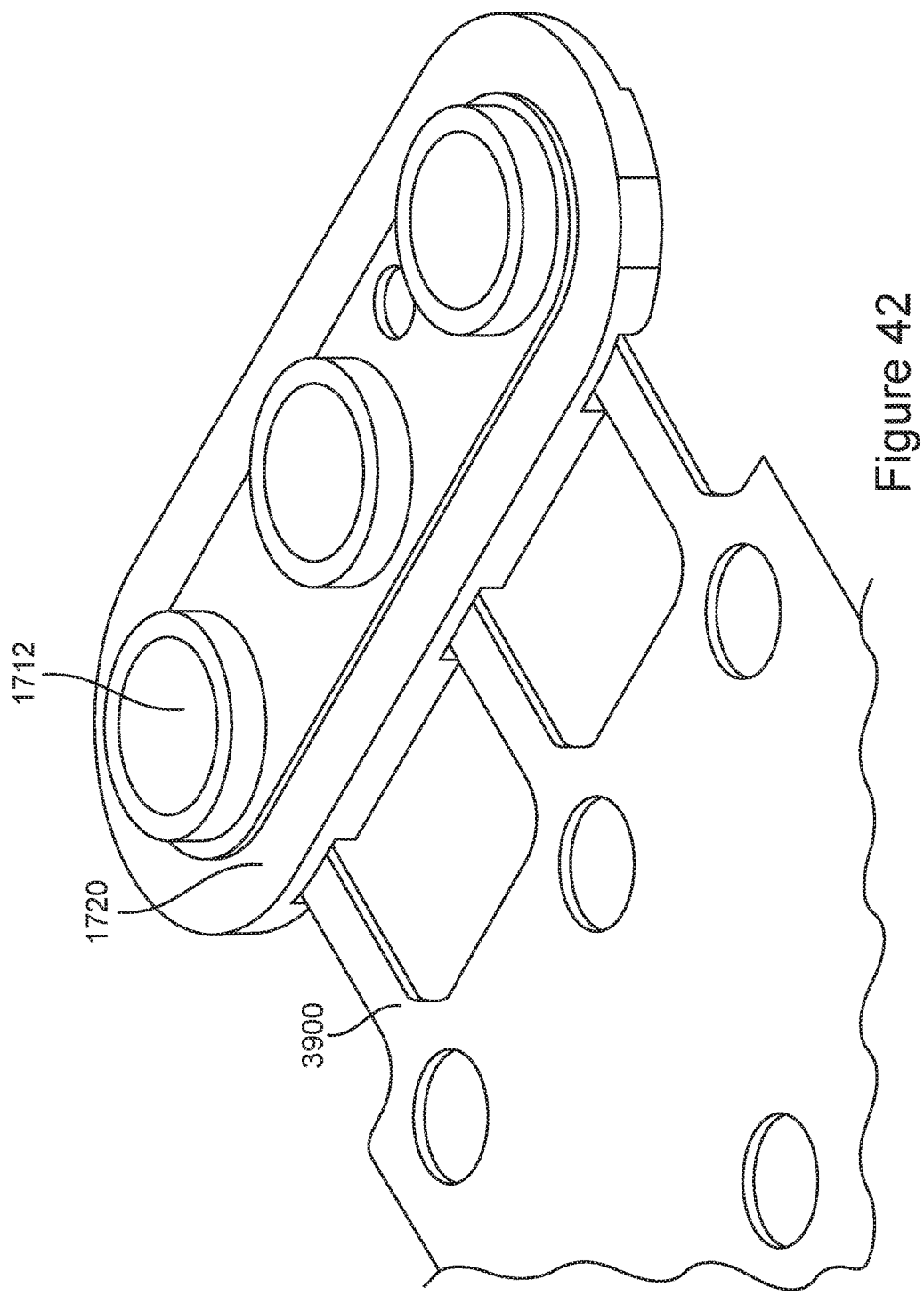

FIGS. 38-42 illustrates another method of manufacturing a portion of a contact structure according to an embodiment of the present invention. In FIG. 38, contacts 1712 and first carrier 3800 may be turned, or machined, forged, or formed in other ways. In FIG. 39, second carrier 3900 may be stamped or formed in other ways. Second carrier 3900 may include paddles 3910. In FIG. 40, contacts 1712 may be attached to paddles 3910 of second carrier 3900 by spot, laser, or resistance welding, or other technique. In FIG. 41, the first carrier 3800 may be detached, and the contacts 1712 may be polished, blasted, and plated. In FIG. 42 plastic insulator 1720 may be formed around contacts 1712 using an overmold or other process. In other embodiments of the present invention, plastic insulator 1720 may be formed elsewhere and then fixed to contacts 1712, by using an adhesive or other technique. Carrier 2600 may be removed, again leaving behind handle 1714 (not shown.)

Embodiments of the present invention may provide contacts that are resistant to corrosion. These contacts may include a top plate to match a color of a device enclosure around the contacts. This top plate may be 0.25 to 1.0 microns, 0.5 to 1.0 microns, 0.5 to 0.85 microns, 0.75 to 0.85 microns thick, or it may have another thickness. At an exposed surface of the contact, gold plating layer may be below the top plate. On other portions of the contact, the top plate may be omitted and the gold plating layer may be the first layer. This layer may be between 0.01 to 0.5 microns or between 0.05 and 0.1 microns thick, or it may have another thickness. A copper layer in the range of 1.0, 2.0, 3.0 or 4.0 microns in thickness may be used. An optional palladium layer may be used above the copper layer. This layer may have a thickness between 0.15 and 2.0 microns, 1.0 and 1.5 microns, 1.0 and 2.0 microns, or it may have another thickness. An optional SnCu layer may be used between a gold layer and a copper layer in areas where contacts may be soldered to flexible circuit boards. This optional SnCu layer may be between 4, 5, and 6 microns in thickness, for example, between 4 and 6 or between 5 and 6 microns in thickness, though it may have other thicknesses consistent with embodiments of the present invention. Another embodiment of the present invention may include a base layer of copper in the range of 1.0, 2.0, 1.0-2.0, 2.0-3.0, 3.0 or 4.0 microns in thickness. A palladium layer may be used above the copper layer. This layer may have a thickness between 0.15 and 2.0 microns, 1.0 and 1.5 microns, 1.0 and 2.0 microns, or it may have another thickness. A gold flash may be placed on that layer. This may be followed by a top plating to match a color of a device enclosure around the contacts. This top plate may be 0.25 to 1.0 microns, 0.5 to 1.0 microns, 0.5 to 0.85 microns, 0.75 to 0.85 microns thick, or it may have another thickness. Other portions of the contacts may have the copper layer, a thinner Pd layer in the range of one, two, or threes tenth of a micron may be used, followed by a gold flash.

In various embodiments of the present invention, different portions of these contact structures and other contact structures may be formed of various materials. For example, bracket 1840 and plastic insulators 1720 may be formed of the same or different materials, such as plastic, LPS, or other non-conductive or conductive material. Contacts 1712 may be formed of noncorrosive materials, such as gold, gold plated copper, gold plated nickel, gold-nickel alloy, and other materials.

In various embodiments of the present invention, different portions of these contact structures and other contact structures may be formed in various ways. For example, bracket 1840 and plastic insulators 1720 may be formed using injection or other molding, printing, or other technique. Contacts 1712 may be machined, stamped, coined, forged, printed, or formed in different ways. Plastic insulator 1720120 may be formed around contacts 1720 using injection molding or other technique.

Embodiments of the present invention may provide contact structures that may be located in various types of devices, such as portable computing devices, tablet computers, desktop computers, laptops, all-in-one computers, wearable computing devices, cell phones, smart phones, media phones, storage devices, keyboards, covers, cases, portable media players, navigation systems, monitors, power supplies, adapters, remote control devices, chargers, and other devices. These devices may include contact structures that may provide pathways for signals and power compliant with various standards such as one of the Universal Serial Bus (USB) standards including USB Type-C, HDMI, DVI, Ethernet, DisplayPort, Thunderbolt, Lightning, JTAG, TAP, DART, UARTs, clock signals, power signals, and other types of standard, non-standard, and proprietary interfaces and combinations thereof that have been developed, are being developed, or will be developed in the future. In one example, the contact structures may be used to convey a data signal, a power supply, and ground. In this example, the data signal may be unidirectional or bidirectional and the power supply may be unidirectional or bidirectional.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. An electronic device comprising:
a device enclosure substantially housing the electronic device and having a plurality of openings;
a plurality of electrical contacts, each located in a corresponding one of the plurality of openings in the device enclosure such that a gap exists between an outside edge of each contact and an inside edge of the corresponding opening in device enclosure, and each having a contacting surface for mating with a contact on a corresponding device when the electronic device and corresponding device are mated; and
a plurality of insulating rings, each filling the gap between the outside edge of an electrical contact and the inside edge of the corresponding opening in the device enclosure.

2. The electronic device of claim 1 wherein each of the plurality of electrical contacts are soldered to a flexible circuit board.

3. The electronic device of claim 2 further comprising a bracket behind the electrical contacts such that the plurality of electrical contacts are between the bracket and the device enclosure.

4. The electronic device of claim 1 wherein the contacting surface of each of the plurality of electrical contacts is at least substantially flush with an outside surface of the device enclosure.

5. The electronic device of claim 1 wherein the contacting surface of each of the plurality of electrical contacts is curved and is at least substantially flush with an outside surface of the device enclosure.

6. The electronic device of claim 1 wherein each of the plurality of insulating rings are formed as part of a separate insulating housing.

7. The electronic device of claim 1 wherein all of the plurality of insulating rings are formed as part of a single insulating housing.

8. An electronic device comprising:
- a device enclosure substantially housing the electronic device and having a plurality of openings;
- a plurality of electrical contacts, each located in a corresponding one of the plurality of openings in the device enclosure, each having a contacting surface for mating with a contact on a corresponding device when the electronic device and corresponding device are mated; and
- a plurality of insulating rings, each ring between a contact and the device enclosure, where for each insulating ring, a contact is located inside and adjacent to an inside edge of the insulating ring and the device enclosure is adjacent to an outside edge of the insulating ring.

9. The electronic device of claim 8 further comprising a bracket behind the plurality of electrical contacts such that the plurality of electrical contacts are between the bracket and the device enclosure.

10. The electronic device of claim 9 wherein an insulating ring is formed as a portion of an insulating housing, and further comprising a silicone gasket between the insulating housing and the device enclosure.

11. The electronic device of claim 8 wherein the contacting surface of each of the plurality of electrical contacts is at least substantially flush with an outside surface of the device enclosure.

12. The electronic device of claim 8 wherein the contacting surface of each of the plurality of electrical contacts is curved and is at least substantially flush with an outside surface of the device enclosure.

13. An electronic device comprising:
- a device enclosure substantially housing the electronic device and having a plurality of openings;
- a plurality of electrical contacts, each electrical contact having a contacting surface on a first side and a contacting portion on a second side opposing the first side, each contacting surface for mating with a contact on a corresponding device when the electronic device and corresponding device are mated and each electrical contact located in a corresponding one of the plurality of openings in the device enclosure; and
- a plurality of insulating rings, each around an outside of a corresponding one the plurality of electrical contacts, wherein for each of the plurality of electrical contacts, the electrical contact, corresponding insulating ring, and device enclosure are contiguous.

14. The electronic device of claim 13 wherein the insulating rings are formed with an insulating housing, wherein the insulating housing is formed of plastic.

15. The electronic device of claim 14 further comprising a seal between the insulating housing and the device enclosure, wherein the seal is a gasket.

16. The electronic device of claim 15 further comprising a flexible circuit board attached to contacting portions of each of the plurality of electrical contacts, wherein the flexible circuit board is attached to the insulating housing using a heat-activated film.

17. The electronic device of claim 16 further comprising a bracket, wherein the bracket is behind the insulating housing such that the plurality of electrical contacts are between the bracket and the device enclosure.

18. The electronic device of claim 17 further comprising a shim between the insulating housing and the device enclosure.

19. The electronic device of claim 13 wherein the contacting surface of each of the plurality of electrical contacts is at least substantially flush with an outside surface of the device enclosure.

20. The electronic device of claim 13 wherein the contacting surface of each of the plurality of electrical contacts is curved and is at least substantially flush with an outside surface of the device enclosure.

* * * * *